(12) United States Patent
Broughton et al.

(10) Patent No.: US 7,254,641 B2
(45) Date of Patent: Aug. 7, 2007

(54) DIGITAL MULTIMEDIA CONTACT CENTER WITH TIER ESCALATION AND DEESCALATION IN RESPONSE TO CHANGED CRITERIA

(75) Inventors: Justin Broughton, Fresno, CA (US); Kevin J. McPartlan, Saratoga, CA (US); Elizabeth Rodgers, San Jose, CA (US); Robert S. Rodgers, San Jose, CA (US); Ivan Covdy, San Jose, CA (US); Roy Ho, San Jose, CA (US); Carl Raymond Kowalski, Fremont, CA (US); D. Thompson McCalmont, San Jose, CA (US); Art Stine, Sunnyvale, CA (US)

(73) Assignee: Intervoice, Inc., Dallas, TX (US)

( * ) Notice: Subject to any disclaimer, the term of this patent is extended or adjusted under 35 U.S.C. 154(b) by 865 days.

(21) Appl. No.: 09/774,944

(22) Filed: Jan. 30, 2001

(65) Prior Publication Data

US 2003/0018702 A1    Jan. 23, 2003

(51) Int. Cl.
*H04M 3/00* (2006.01)
*G06F 15/173* (2006.01)
(52) U.S. Cl. .................. 709/240; 709/242; 379/266.01
(58) Field of Classification Search ................ 709/204, 709/206, 244; 370/260, 352, 356, 389, 392; 379/265.01, 265.05, 265.06, 265.09, 265.13
See application file for complete search history.

(56) References Cited

U.S. PATENT DOCUMENTS

| | | |
|---|---|---|
| 5,282,243 A | 1/1994 | Dabbaghi et al. |
| 5,390,295 A | 2/1995 | Bates et al. |
| 5,491,795 A | 2/1996 | Beaudet et al. |
| 5,530,744 A | 6/1996 | Charalambous et al. .... 379/265 |

(Continued)

FOREIGN PATENT DOCUMENTS

EP    1 016 998 A2    5/2000

(Continued)

OTHER PUBLICATIONS

Steul, D., "Redefining the call center: customer service on the Internet", Alcatel Telecommunications Review (France), No. 1, p. 38-42, 2000.*

(Continued)

*Primary Examiner*—Patrice L. Winder
(74) *Attorney, Agent, or Firm*—Fulbright & Jaworski LLP

(57) ABSTRACT

A tiered service model for a digital multimedia contact center assigns an entering contact to an initial service tier based on routing criteria for the contact and may escalate or de-escalate the contact to a different service tier if the routing criteria changes. The routing criteria is initially determined based on a media type associated with the contact. The digital multimedia contact center contains a set of media routers, each of which passes a contact of a particular media type to a workflow engine which executes workflows to direct the processing of contacts at service tiers that require agent activity. Agents are allocated to contacts by a dynamic automate contact distributor and the appropriate media router is used to route the contact to an agent. The workflow engine also executes workflows for agents to control the allocation of agents to contacts.

12 Claims, 23 Drawing Sheets

U.S. PATENT DOCUMENTS

| | | | |
|---|---|---|---|
| 5,613,068 A | 3/1997 | Gregg et al. | |
| 5,848,143 A | 12/1998 | Andrews et al. | |
| 5,903,642 A | 5/1999 | Schwartz et al. | |
| 6,046,741 A | 4/2000 | Hochmuth | |
| 6,046,762 A | 4/2000 | Sonesh et al. | |
| 6,049,603 A | 4/2000 | Schwartz et al. | |
| 6,094,479 A | 7/2000 | Lindeberg et al. | |
| 6,122,364 A | 9/2000 | Petrunka et al. | |
| 6,141,341 A | 10/2000 | Jones et al. | 370/352 |
| 6,144,667 A | 11/2000 | Doshi et al. | |
| 6,188,673 B1 | 2/2001 | Bauer et al. | |
| 6,188,761 B1 | 2/2001 | Dickerman et al. | |
| 6,201,804 B1 | 3/2001 | Kikinis | |
| 6,212,565 B1 | 4/2001 | Gupta | |
| 6,219,648 B1 | 4/2001 | Jones et al. | |
| 6,225,998 B1 | 5/2001 | Okita et al. | |
| 6,266,058 B1 | 7/2001 | Meyer | |
| 6,289,001 B1 | 9/2001 | Smyk | |
| 6,298,383 B1 | 10/2001 | Gutman et al. | 709/229 |
| 6,301,480 B1 | 10/2001 | Kennedy, III et al. | 455/445 |
| 6,330,326 B1 | 12/2001 | Whitt | 379/265.13 |
| 6,337,858 B1 | 1/2002 | Petty et al. | 370/356 |
| 6,366,577 B1 | 4/2002 | Donovan | |
| 6,377,568 B1 | 4/2002 | Kelly | |
| 6,400,804 B1 | 6/2002 | Bilder | 379/76 |
| 6,434,143 B1 | 8/2002 | Donovan | |
| 6,463,148 B1* | 10/2002 | Brady | 379/265.01 |
| 6,493,695 B1* | 12/2002 | Pickering et al. | 706/47 |
| 6,542,475 B1 | 4/2003 | Bala et al. | |
| 6,574,218 B1 | 6/2003 | Cooklev | |
| 6,584,191 B1* | 6/2003 | McPartlan et al. | 379/265.02 |
| 6,590,596 B1 | 7/2003 | Rector | |
| 6,600,735 B1 | 7/2003 | Iwama et al. | 370/352 |
| 6,614,902 B1 | 9/2003 | Rizzetto | 379/265.11 |
| 6,615,235 B1 | 9/2003 | Copeland et al. | |
| 6,639,982 B1 | 10/2003 | Stuart et al. | |
| 6,665,395 B1* | 12/2003 | Busey et al. | 379/265.09 |
| 6,678,265 B1 | 1/2004 | Kung et al. | |
| 6,697,858 B1* | 2/2004 | Ezerzer et al. | 709/224 |
| 6,704,409 B1* | 3/2004 | Dilip et al. | 379/265.02 |
| 6,704,412 B1 | 3/2004 | Harris et al. | |
| 6,724,884 B2 | 4/2004 | Jensen et al. | 379/265.01 |
| 6,741,698 B1 | 5/2004 | Jensen | 379/265.02 |
| 6,771,765 B1* | 8/2004 | Crowther et al. | 379/265.09 |
| 6,778,494 B1 | 8/2004 | Mauger | 370/230 |
| 6,781,959 B1 | 8/2004 | Garakani et al. | |
| 6,823,382 B2* | 11/2004 | Stone | 709/224 |
| 6,850,599 B2 | 2/2005 | Yoshitani | 379/37 |
| 6,850,613 B2* | 2/2005 | McPartlan et al. | 379/265.02 |
| 6,868,059 B1 | 3/2005 | Jones et al. | |
| 6,937,715 B2* | 8/2005 | Delaney | 379/265.09 |
| 7,035,252 B2 | 4/2006 | Cave et al. | 370/356 |
| 7,085,263 B1 | 8/2006 | Fitzgerald | 370/352 |
| 2001/0024497 A1* | 9/2001 | Campbell et al. | 379/265.09 |
| 2003/0018702 A1 | 1/2003 | Broughton et al. | |
| 2003/0133558 A1 | 7/2003 | Kung et al. | |
| 2003/0195753 A1 | 10/2003 | Homuth | |
| 2004/0054743 A1* | 3/2004 | McPartlan et al. | 709/206 |
| 2004/0066923 A1 | 4/2004 | Robinson | 379/166 |
| 2004/0141508 A1* | 7/2004 | Schoeneberger et al. | 370/401 |
| 2004/0221053 A1* | 11/2004 | Codella et al. | 709/231 |

FOREIGN PATENT DOCUMENTS

| | | |
|---|---|---|
| EP | 1 032 188 A1 | 8/2000 |
| JP | 11-234408 | 8/1999 |
| JP | 11-266306 | 9/1999 |
| JP | 2000-244568 | 9/2000 |
| WO | WO 99/65214 | 12/1999 |
| WO | WO 01/35601 | 5/2001 |
| WO | WO 01/61529 A2 | 8/2001 |

OTHER PUBLICATIONS

Busemann, Stephan et al.,"Message classification in the call center", ACM Applied Natural Language Conferences, p. 158-165, 2000.*

Reasoner, Karen,"The modernization of a call center", ACM SIGUCCS, p. 270-273, Nov. 2000.*

Brown, D., "The Interaction Center Platform™," ©Interactive Intelligence, Inc., Apr. 6, 2001, 31 pages.

CosmoCom™, "CosmoCall Universe™ Technology Overview," Available: http://www.cosmocom.com/ProductInfo/techover.htm, 3 pages.

Taylor, M., "Integrated Versus Unified CTI-What's the Difference?" CTI Magazine, Oct. 1997, Available: http://www.inin.com/news/presscoverage.asp?id=14, 9 pages.

"Signaling Gateway CX6100-SG", Haraski et al., pp. 138-142, NEC Res & Develop., vol. 42, No. 2., Apr. 2001.

"Media Gateway CX3200", Naoki Satoh et al., pp. 133-137, NEC Res & Develop., vol. 42, No. 2, Apr. 2001.

Canadian Office Action cited prior art (3 pages) for 2,434,922 dated Sep. 2006.

European Search Report (2 pages) for EPA 00 30 0571 dated Jun. 2000.

Japanese Office Action (English Language Translation) issued for JP 2002-564925, dated Dec. 19, 2006, 5 pages.

* cited by examiner

DIGITAL MULTIMEDIA CONTACT CENTER WITH TIER ESCALATION AND DEESCALATION IN RESPONSE TO CHANGED CRITERIA

FIELD OF THE INVENTION

This invention relates generally to the operations of a customer contact center, and more particularly to a contact center that processes contacts having different media types.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright® 1999, NUASIS Corporation, All Rights Reserved.

BACKGROUND OF THE INVENTION

Call centers are typically used by organizations to service customers. Traditionally, customers called into a call center using POTS (plain old telephone service) but more and more organizations are implementing other types of media access such as email, voice mail, Web browsing, etc. to expand the ways by which their customers may contact them. Current attempts to integrate the different media into a single call center have proved ineffective because of the disparate nature of the different media types. For example, telephone calls usually average a few hundred a day, while emails often run into thousands a day, and daily hits on a Web site frequently number hundreds of thousands. Additionally, the response time expected by the customer varied depending on the media type used.

One approach processes a contact based on its media type. This approach ignores the fact that the same media type can be used for different types of service. For example, a customer that calls a manned help line requires different handling than a customer calling an interactive voice response system. Another approach is to handle all contacts identically, regardless of media type. This approach fails to account for the different number of contacts and different expected response times for a customer independent of the various media types. Thus, a call center that processes all calls as requiring an immediate response quickly becomes overloaded with emails. Furthermore, both of these approaches involve extensive modifications to the systems that underlie the call center, such as the email system, the telephony system, etc., so that the many of the original features and benefits of the underlying systems are lost. Additionally, while some previous implementations appear to integrate analog contacts, such as voice calls, and digital contacts, such as email, the actual processing of the two types of contacts is separated.

SUMMARY OF THE INVENTION

The above-mentioned shortcomings, disadvantages and problems are addressed by the present invention, which will be understood by reading and studying the following specification.

A tiered service model for a digital multimedia contact center assigns an entering contact to an initial service tier based on routing criteria for the contact and may escalate or de-escalate the contact to a different service tier if the routing criteria changes. The routing criteria is initially determined based on a media type associated with the contact. The digital multimedia contact center contains a set of media routers, each of which passes a contact of a particular type to a workflow engine. The workflow engine starts a workflow for the contact and calls a dynamic automatic contact distributor to allocate an agent to the contact if the service tier of the contact requires agent activity. The workflow engine returns an identifier for the allocated agent to the media router, which then routes the contact to an agent desktop for the agent. The agent desktop presents the contact to the agent for processing. The workflow engine also creates a workflow for an agent to control the allocation of the agent to contacts.

The digital multimedia contact center operates in conjunction with existing systems dedicated to a particular media type without requiring major modifications to those systems, thus leveraging the functionality of the existing systems. For example, emails are generally handled at one service tier by the standard operations of a conventional email system unless specially marked in the email system as having been escalated to a higher service tier. Similarly, voice calls are initially assigned to a high service tier for handling by an agent but can be de-escalated to a lower service tier and routed to an existing interactive voice response system if appropriate. Thus, the digital multimedia contact center handles contacts in accordance with the contact's required level of service instead of relying solely on the media type to determine the necessary processing. Furthermore, the digital multimedia contact center implements the most appropriate processing methodology for the number of contacts expected at each service tier.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

The detailed description is divided into four sections and a conclusion. In the first section, a system level overview of the invention is presented. In the second section, methods for an embodiment of the invention are described with reference to flowcharts. In the third section, a particular Internet Contact Center (iCC) implementation of the invention is described. In the final section, an operating environment in conjunction with which embodiments of the invention may be practiced is presented.

System Level Overview

A system level overview of the operation of an embodiment of the invention is described by reference to FIGS. 1 and 2.

Figure 1:
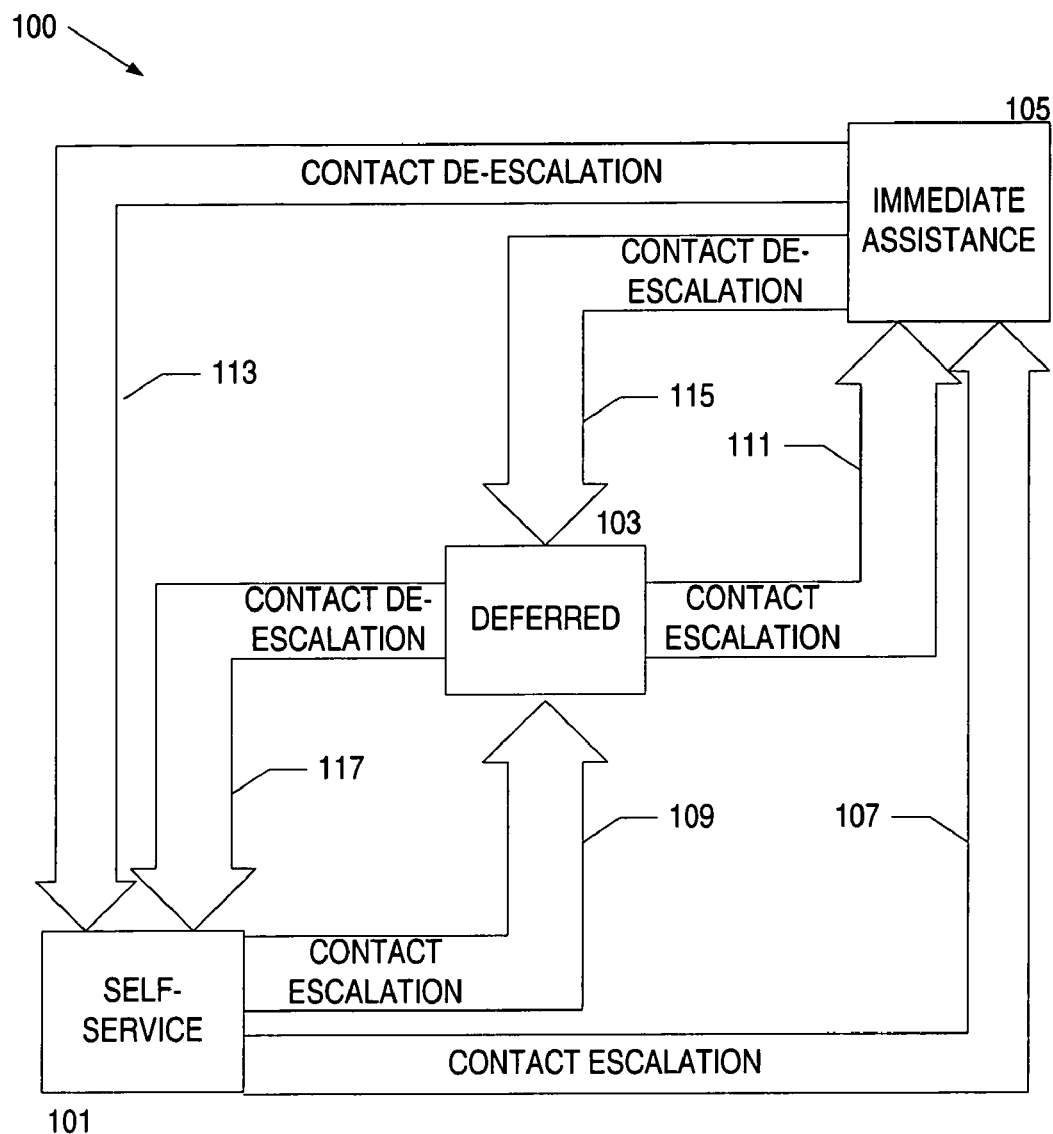
FIG. 1 is a diagram illustrating a three-tiered service model for a digital multimedia contact center of the present invention.

FIG. 1 illustrates a three-tiered service model 100 for a digital multimedia contact center. As shown, there are three service tiers: self-service tier 101, deferred service tier 103, and immediate assistance tier 105. Contacts accessing the center at the self-service tier 101 do not require the assistance of an agent at the contact center, while contacts being serviced at the deferred tier 103 and the intermediate assistance tier 105 do require agent activity. A contact accessing the center at deferred tier 103 is presented to an agent in a "pull" model as a background task on the agent's computer desktop. An agent pulls a deferred contact for processing when there are no immediate assistance contacts to process. A contact at the immediate assistance tier 105 is presented in a "push" model as a foreground task. One immediate assistance contact is pushed to the agent's desk at any one time and in such a way that it is obvious to the agent that this contact must be handled immediately. As a particular contact is presented, any related customer information is also shown. The components for the different tiers are designed to handle different magnitudes of contacts. The self-service tier components will process orders of magnitude more contacts than the deferred tier components, which will process orders of magnitude more contacts than the immediate assistance tier components.

A contact entering the contact center is initially assigned to one of the three tiers based on the type of media used by the contact in accessing the contact center. The embodiment shown in FIG. 1 is further described with reference to three media types: voice calls, emails, and World Wide Web, although the invention is not so limited. Voice calls are initially routed to the immediate assistance tier 103, emails are initially routed to the deferred tier 102, and Web contacts are initially routed to the self-service tier 101. Subsequent routing may be performed that escalates or de-escalates the contact to another tier (shown as arrows in FIG. 1). The subsequent routing can be based on one or more routing criteria, including factors defined by the contact center owner or subscriber, such as priority, access phone numbers, and time-out periods, and environmental factors such as contact activity. The routing criteria associated with a contact may change as the various components in the contact center process the contact. For example, if the routing criteria of a contact passes a pre-defined threshold, the contact may be escalated or de-escalated. Thus, an email is escalated (arrow 111) to the immediate assistance tier 103 if it has not been answered when a "time-to-reply" period elapses. A voice call is initially routed to the immediate assistance tier 103 but is de-escalated (arrow 115) to the deferred tier 103 if the caller chooses to leave voice-mail, or de-escalated (arrow 113) to the self service tier 103 if the contact is sent to an interactive voice response (IVR) system for more processing. A self service Web contact can be escalated (arrow 107) into the immediate assistance tier 103 by through "Click to Chat" or "Click to Talk" buttons available on the Web site, or escalated (arrow 109) to the deferred tier 103 if the contact chooses to send an email instead. Details of the escalation and de-escalation of each media type is described in more detail in conjunction with the flowcharts in the next section. Furthermore, although the exemplary embodiments focus on voice, email, and Web contacts for ease in understanding, it will be appreciated that the invention encompasses all potential analog and digital media types, including fax, "faxback," video, etc., in addition to being extensible to other WANs and to LANs. It will also be appreciated that the contact is not limited by its initial media type so, for example, the contact and agent in a collaboration session could be also taking by phone, an email message could generate a return fax or phone call, or the expiration of a time-out on a collaboration request might generate an email message to the contact promising a response within a set time period.

Figure 2:
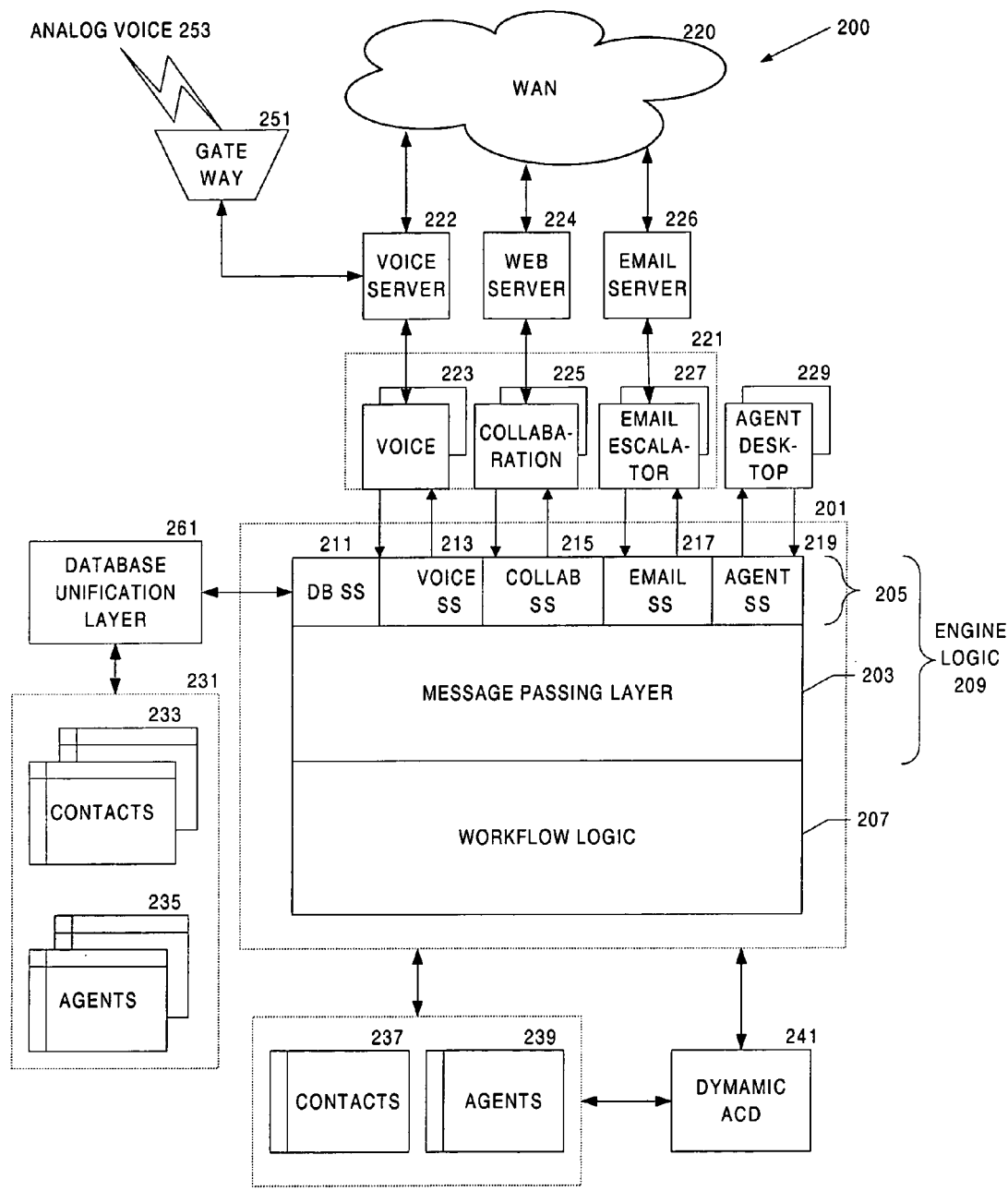
FIG. 2 is a diagram illustrating an embodiment of a system architecture underlying the digital multimedia contact center model shown in FIG. 1.

The three-tier service model 100 illustrated in FIG. 1 operates within a digital multimedia contact system, one embodiment of which is shown in FIG. 2. The system architecture for contact center 200 is based on a workflow engine 201 that directs the activities of the agents in the center using workflow steps. A contact workflow is initiated by events that are routed into one of a set of workflow subsystems 205 by one of a set of media routers 221. Each media router 221 and each corresponding workflow subsystem 205 are dedicated to a contact media type. An agent workflow is initiated by events routed into an agent subsystem 219 by an agent desktop component 229. Events that trigger a workflow include a new call arriving at the contact center or an agent logging in. The workflow for a contact remains active until the contact is terminated; the workflow for an agent remains active until the agent logs out of the contact center 200.

The workflows are executed by workflow logic 207. Events are passed between the workflow logic 207 and the workflow subsystems 205 by a message passing layer 203. The events can also modify the execution flow of existing contact or agent workflows.

When executed by the workflow logic 207, a workflow for an immediate assistance contact causes a dynamic ACD (automatic contact distributor) 241 to allocate an agent to the contact. The allocation is also reflected in the agent's workflow. The operation of the dynamic ACD 241 is described in further detail below.

A contact coming into the contact center 200 is initially classified in accordance with a set of previously defined classifications, e.g., Sales, Customer Service, Support, etc., by the appropriate workflow subsystem 205. Additional information is also gathered to determine the optimal routing of the contact. Information that narrows down the set of agents to which a contact can be routed is referred to as "contact requirements." Examples of contact requirements include product knowledge, language fluency, and previous communication with the contact (each contact is considered a new one). Origin and destination information now is consistently collected from all media types, such as calling phone number and called phone number for voice calls. Subject information may also be collected from voice contacts based on responses to IVR menu options.

A voice router 223 provides an interface between a voice subsystem 213 and a conventional digital telephony system (voice server 222), such as the DOT (Distributed Open Telephony) server from Tundo Corporation that handles IP (Internet Protocol) calls. The voice subsystem 213 starts a workflow when a call arrives at the contact center 200 and communicates a request to the voice server 222 to redirect the call to an agent (or to voice mail or IVR) as determined by the workflow. The voice server 222 receives digital voice calls (referred to as voice-over-IP or VoIP) directly from a digital wide-area network (WAN) 220, such as the Internet, or via a gateway 251, such as the Tundo Gateway, that converts analog voice calls 253 to VoIP calls. The gateway 251 also converts VoIP calls from the digital telephony system 222 into analog voice signals for transmission back to the caller.

A conventional email system (email server 226), such as the Cisco Email Manager from Cisco Systems, processes deferred contacts received from the WAN 220. The email system uses its own in-line rules engine for processing incoming email and placing it into mailboxes to be accessed by the agents as background tasks. The agents retrieve deferred contacts from these mailboxes explicitly. An email escalator 227 provides an interface between an email subsystem 217 and the conventional email system for emails that are escalated from deferred to immediate assistance. The email escalator 227 periodically reviews the mailboxes for pending emails that meet per-determined criteria for escalation, such as time-to-reply or customer value parameters. It then collects information about the email (customer, priority etc.) and passes this to the email subsystem 217. In one embodiment, the emails are evaluated in chronological order and the emails that meet the escalation criteria are further broken down by classification and within a particular classification, the email is passed to the email subsystem 217 on a first-in, first-out basis.

The email subsystem 217 determines if the contact is entitled to be escalated to an immediate assistance contact based on the contact information and starts a contact workflow if it is. When the workflow succeeds in routing the email to an agent, the agent address is returned to the email escalator 227, which passes it to the email subsystem 217 for actual routing to the agent. In an embodiment in which voice mail is routed to an agent as an audio attachment to an email, the email escalator 227 also serves to escalate voice mails to the immediate assistance tier if appropriate.

A conventional Web server 224 processes self-service contacts that originate from the WAN 220. Such a server can offer browsing and searching capabilities for a knowledge base, or a set of FAQs (frequently asked questions). A collaboration router 225 provides an interface between a collaboration subsystem 215 and a conventional collaboration system, such as the Cisco Collaboration Server from Cisco Systems, that executes on, or in conjunction with, the Web server 224. Web pages on the Web server 224 are modified to include "Click to Chat/Talk" buttons to connect to the collaboration system. When the button is clicked by a Web contact, the collaboration system sends an event to the collaboration router 225, which in turns sends an event to the collaboration subsystem 215. The collaboration subsystem 215 determines if the contact is entitled to be escalated to an immediate assistance contact and initiates a contact workflow if so. Once the collaboration request has been assigned to an agent, the agent address is passed back to the collaboration router 225 for actual routing. Other agents may be included in the collaboration session as necessary.

An agent subsystem 219 provides an interface between one or more agent desktops 229 and the workflow logic 207 for agent events. When notified of an agent login by the corresponding agent desktop 229, the agent subsystem 219 validates the agent before starting an agent workflow that describe the agent's work process until the agent logs out. The agent desktop 229 notifies the agent subsystem 219 of all agent state changes. The agent subsystem 219 is also responsible for watching the agent's phones for outbound call events. It passes this information to the workflow logic 207 to ensure the agent state is changed to "busy." In addition, when an agent initiates a call, the agent subsystem 219 sends an "outbound call" event to the agent's workflow so that agent-initiated contacts can be tracked.

The agent desktop 229 controls the presentation of tasks on an agent's desktop. The tasks originate from the multiple conventional systems with which the contact center 200 interfaces as previously described, as well as from the workflow engine 201. Each of the conventional systems has its own user interface. Monitoring tools may also be available to certain agents, such as those providing statistics on the operation of the contact center and individual agents. The agent desktop 229 integrates the separate user interfaces into a single coherent interface that presents the agent with immediate assistance contacts as foreground tasks and deferred contacts as background tasks. Thus, for example, the foreground mode integrates the telephony interface, the collaboration interface, and the email interface (for escalated emails). Similarly, the background mode integrates the email interface (for non-escalated emails and other deferred contacts, such as voice mail, fax, forms, etc.) and the monitoring tools, for example. The agent desktop 229 also integrates with any existing customer relation management application to provide customer information to the agent for the foreground and background tasks. The connections between the agent desktops 229 and the conventional systems 222, 224, 226 are not shown in FIG. 2 for clarity in illustration.

In an alternate embodiment not shown, the agent desktops 229 do not communicate directly to the agent subsystem 219 but are managed through a desktop manager component that handles concurrent requests from desktops and routes responses. To concurrently handle multiple desktops, a client portion of the desktop manager executes within each agent desktop component and communicates with a server portion that queues events arriving from the agent subsystem 219 and sends them to the appropriate desktop in response to polls from the desktops. Executing the server portion of the desktop manager on a machine separate from that executing the agent subsystem, provides additional scaling capabilities to the contact center.

The relationship among the components of the contact center 200 described so far is most easily understood through an example. When an analog voice call 253 is received by the gateway 251, it is converted to a VoIP call and directed by the voice server 222 to a voice media router 223. The voice media router 223 informs the voice subsystem 213 of the incoming contact and the voice subsystem 213 creates a workflow for the contact. Assuming the contact is to remain at the immediate assistance tier 103, the workflow requests the dynamic ACD 241 allocate an agent to the contact. The dynamic ACD 241 passes the agent information back to the voice subsystem 213, which then sends the agent and contact information to the voice router 223. The voice router 223, in turn, sends the information to the voice server 222 for routing. The voice server 222 transfers the contact to the appropriate agent desktop 229 as a foreground task.

Returning now to FIG. 2, the workflow engine 201 also contains a database 231 of contact 233 and agent records 235. A database unification layer 261 combines the information in the database 231 and information maintained by the voice 222, Web 224, and email 226 servers into a coherent view of the contact center. The contact and agent workflows query and update the database 231 through a database subsystem 211 that converts workflow requests into calls for the database unification layer 261. In an alternate embodiment not shown in FIG. 2, the contact and agent workflows query the database unification layer 261 directly. In yet another alternate embodiment, the database unification layer is incorporated into the database subsystem 211.

The database unification layer 261 has access to, and is accessible by, all the other components of the contact center to allow reporting and analysis of the activities of the contact center regardless of the media type used by the contacts. The connections between the database unification layer 261 and the other components are not shown in FIG. 2 for clarity in illustration. The information can be retrieved through the database unification layer 261 by a monitoring tool (not shown) to graphically and/or numerically illustrate the state of the contact center (number of contacts awaiting service, how many agents are on break, etc.). For instance, the monitoring tool may display the number of unserviced contacts broken down by classification. Additionally, a conventional reporting application can be employed to obtain information through the database unification layer 261 for standardized reports. Agents, supervisors and managers may each have access to a set of such reports to gauge the efficiency of the contact center, a group, or individual agent. The database unification layer 261 also provides for the collection of billing information and for the tracking of contacts through the contact center, both across media types.

In the embodiment shown in FIG. 2, the dynamic ACD 241 uses unordered lists of waiting contacts 237 and available agents 239 to match a contact with an agent. The workflow engine 201 causes the dynamic ACD 241 to create and manage the unordered lists of contacts 237 and agents 239. Although shown as separate from the database 231 in FIG. 2, it will be appreciated that the unordered lists 237, 239 may be database structures that are managed by the database subsystem 211 as instructed by the workflow engine 201 and the dynamic ACD 241.

As previously described, contact requirements (e.g., product knowledge, language fluency, previous communication) are used to determine the set of agents to which a contact can be routed. Information used to decide the appropriateness of an agent within the set is referred to as "agent attributes" and may include such parameters as seniority and length of time waiting for a contact. Furthermore, agents may be dedicated to one or more contact classifications. When an immediate assistance contact requests an agent, the dynamic ACD 241 searches for an appropriate agent from the list 239 of available agents by filtering the agents against the contact classification and any requirements, and prioritizes the resulting agents according to their attributes. If an agent is available, the dynamic ACD 241 passes the information for the agent back to the appropriate subsystem to route the contact to the agent and removes the agent from the available agent list 239. If no appropriate agent is available, the contact is entered into the waiting contact list 237 until an appropriate agent becomes available to take the contact. Similarly, when an agent requests a contact, the waiting contact list 237 is filtered by classification and "agent requirements" (e.g., media type, territory) and prioritized according to contact attributes such as time in queue and business value. The matching process is invoked by a step in the contact workflow for an immediate assistance contact or in the agent workflow for an available agent as explained further below.

As illustrated in FIG. 2, there may be multiple instances of each of the media routers 221. There is also an instance of the agent desktop 229 running on each agent workstation in the contact center. Although only a single set of workflow subsystems 205 is shown, it will be appreciated that workflow engine 201 may contain multiple instances of one or more of the workflow subsystems 205 depending on workload. Additionally, multiple workflow engines 201 may be present within a contact center 200.

Furthermore, the architecture permits distribution of the various components among multiple computers, thus enabling scalability of the contact center 200. As described previously, each component provides services for other components. For instance, the dynamic ACD 241 provides an agent allocation service and the collaboration subsystem 215 provides a collaboration workflow service. In one embodiment, a service manager (not shown) provides a central location for registration and discovery of the contact center service providers. When a component needs a service (such as the initialization of a workflow), it calls the service manager to find the location of that service. The service manager reviews a list of all registered providers of that service and selects the appropriate providers (e.g., shortest routing to requester). Finally it chooses the best provider based on the unused capacity of each service. Thus, the contact center 200 may continue to start services on new or existing machines as necessary to deal with its workload.

The system level overview of the operation of an embodiment of the invention has been described in this section of the detailed description. A tiered service model that allows the escalation and de-escalation of a contact has been described, along with its operation within a digital multimedia contact center. The digital multimedia contact center handles contacts in accordance with the contact's required level of service instead of relying solely on the media type to determine the necessary processing. Because different levels of service incur different quantities of contacts, different processing methodologies are appropriate within the contact center. Thus, workflows are used to handle immediate assistance contacts regardless of media type because a workflow engine excels at processing relatively small numbers of contacts in real-time. A workflow engine also gives the subscriber fine-grained control over the handling of the high priority contacts that require immediate assistance. On the other hand, deferred contacts number least an order of magnitude greater than immediate assistance contacts and are handled most efficiently through an inline rule engine such as commonly implemented in an email (and/or voice mail) system. Finally, because the greatest number of contacts are self-service contacts which require no agent intervention, processing techniques such as interactive voice response, automatic email response, and knowledge base/FAQ logic on Web servers are used.

While the invention is not limited to any particular number of service tiers, the invention has been described in terms of a three tier model. The invention has further been described using an example that mixes voice calls, emails, and Web contacts within the same contact center but the invention is not so limited. Additionally, the invention can be practiced with any underlying architecture that allows the escalation and de-escalation of contacts through a tiered service model.

Methods of Embodiments of the Invention

In the previous section, a system level overview of the operations of embodiments of the invention was described. In this section, the particular methods of one embodiment of the multimedia copy contact center 200 are described in terms of computer software with reference with a series of flowcharts and also a series of tier diagrams. The flowcharts and tier diagrams are grouped according to related components within the contact center. Thus, FIG. 3A and flowcharts FIGS. 4A–C illustrate the processing of the voice components. FIG. 3B and flowcharts 5A–C illustrate the processing of the email escalator components. FIG. 3C and flowcharts 6A–C illustrate the processing of the collaboration components. The processing of the agent components are illustrated only through flowcharts in FIGS. 7A–C.

The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media) acting as one or more of the components of the contact center 200 in FIG. 2. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result.

Figure 3A:
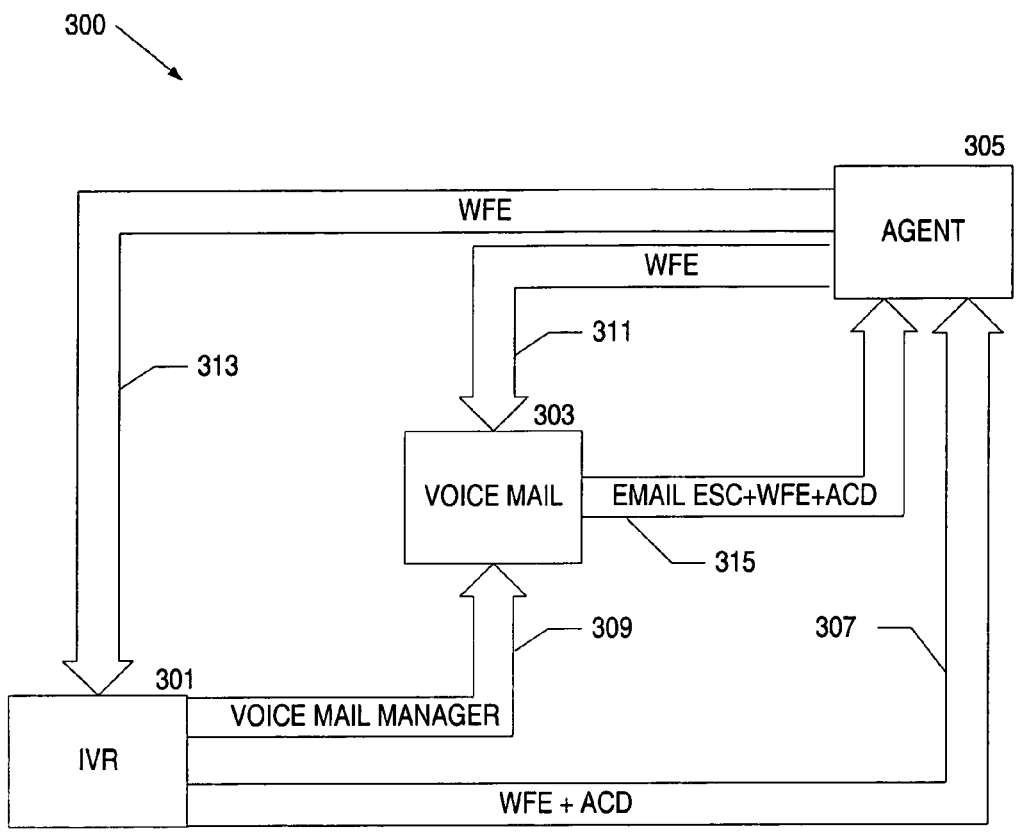
FIGS. 3A–C are diagrams illustrating the processing of media-specific contacts within the architecture of the digital multimedia contact center shown in FIG. 2.
Figure 3B:
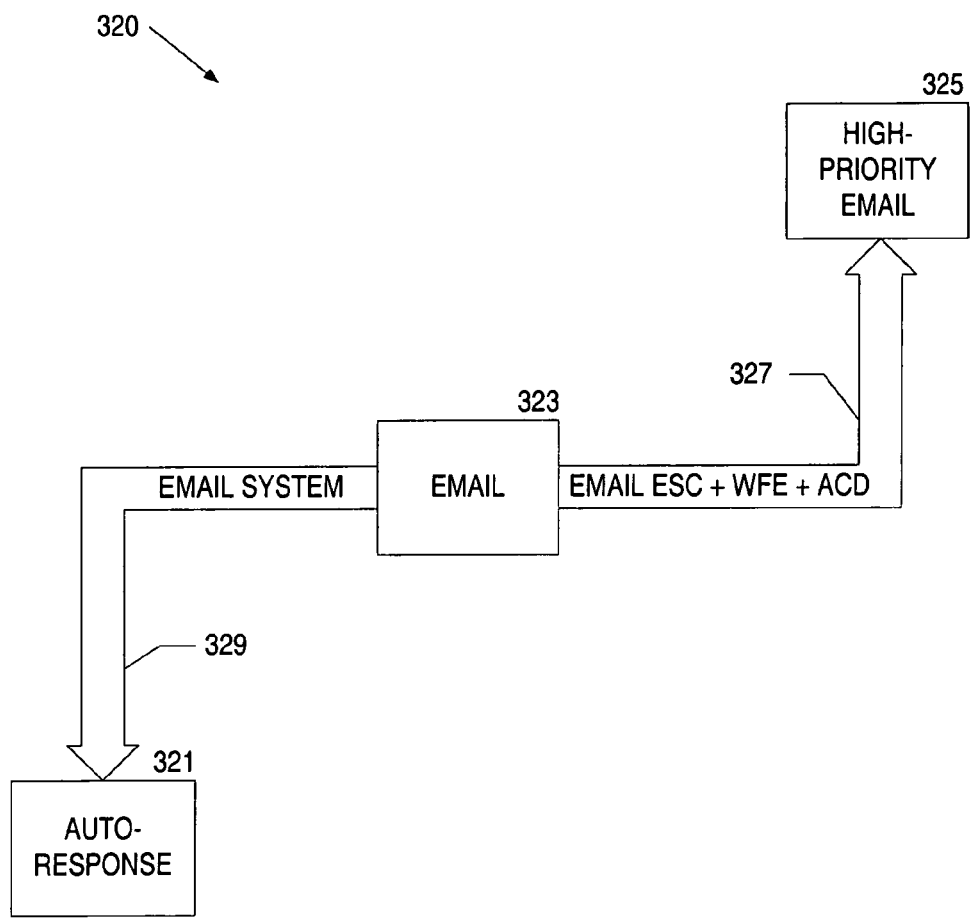
Figure 3C:
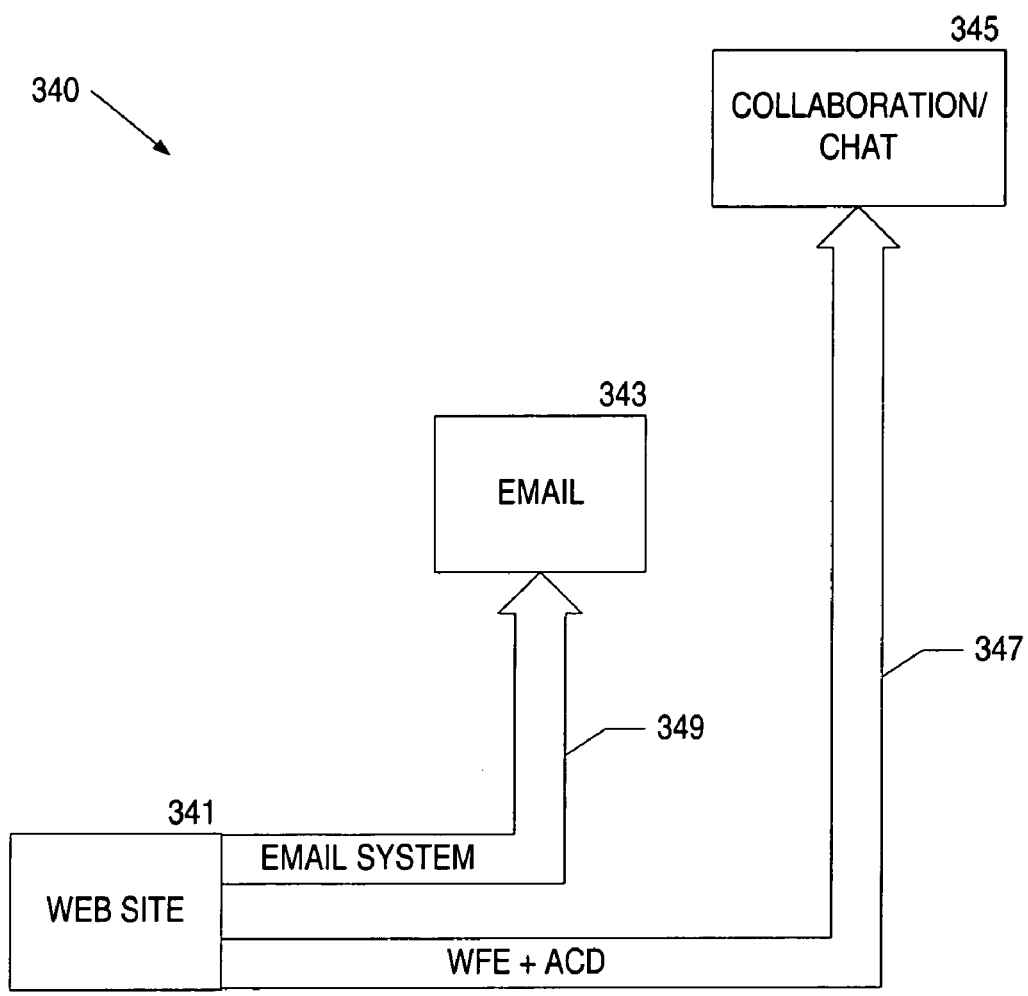
Figure 4A:
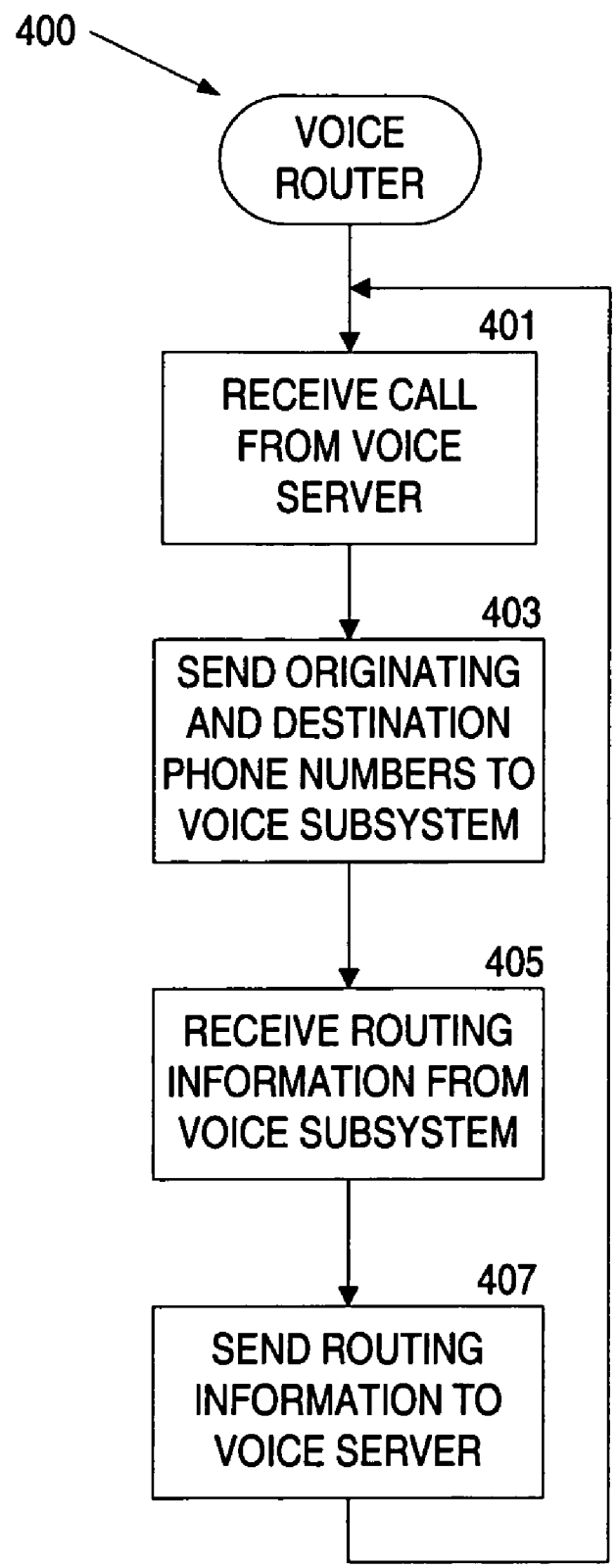
FIGS. 4A–C are flowcharts of method to be performed by voice components in the embodiment of the digital multimedia contact center shown in FIG. 2.
Figure 4B:
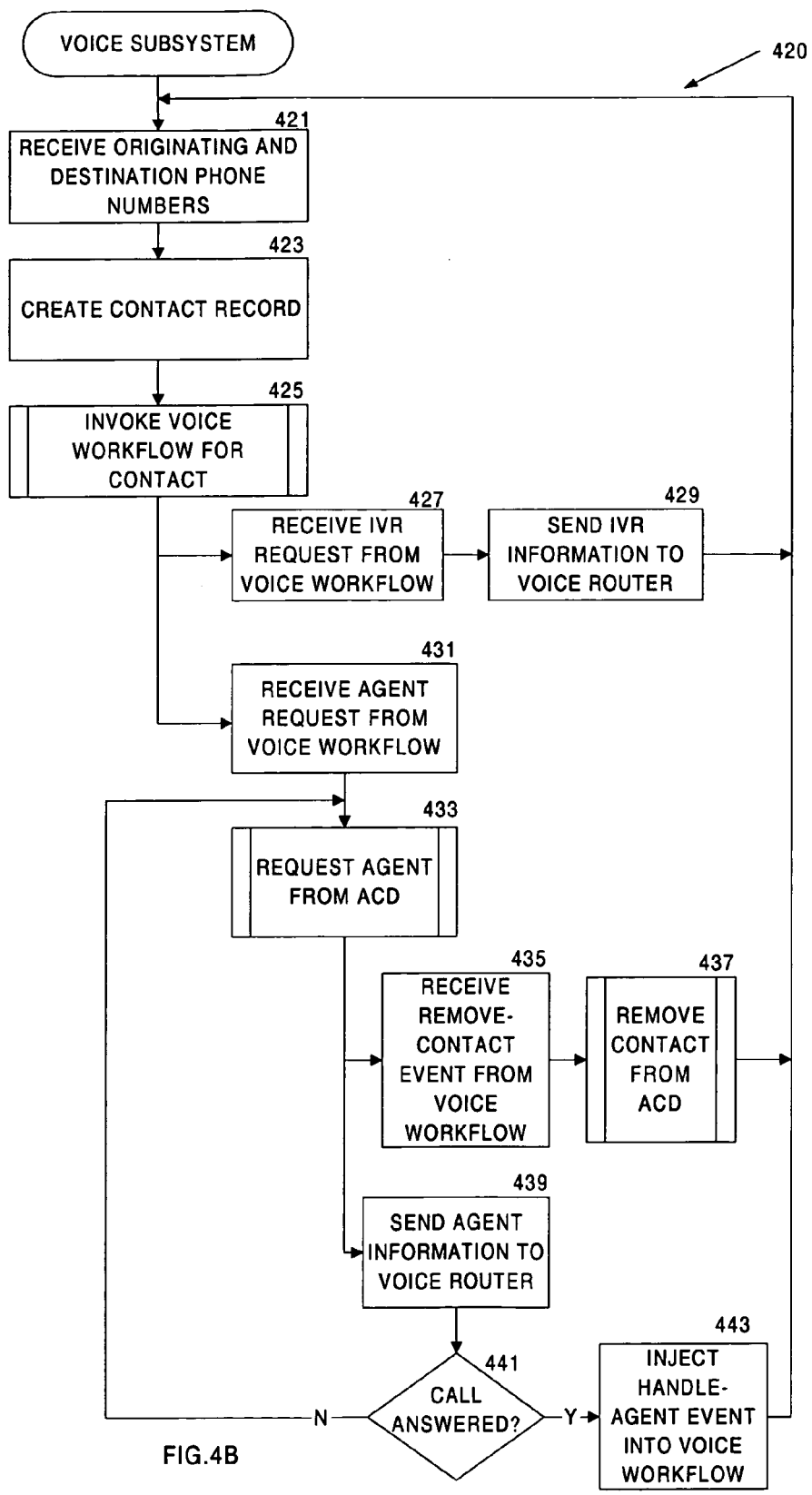
Figure 4C:
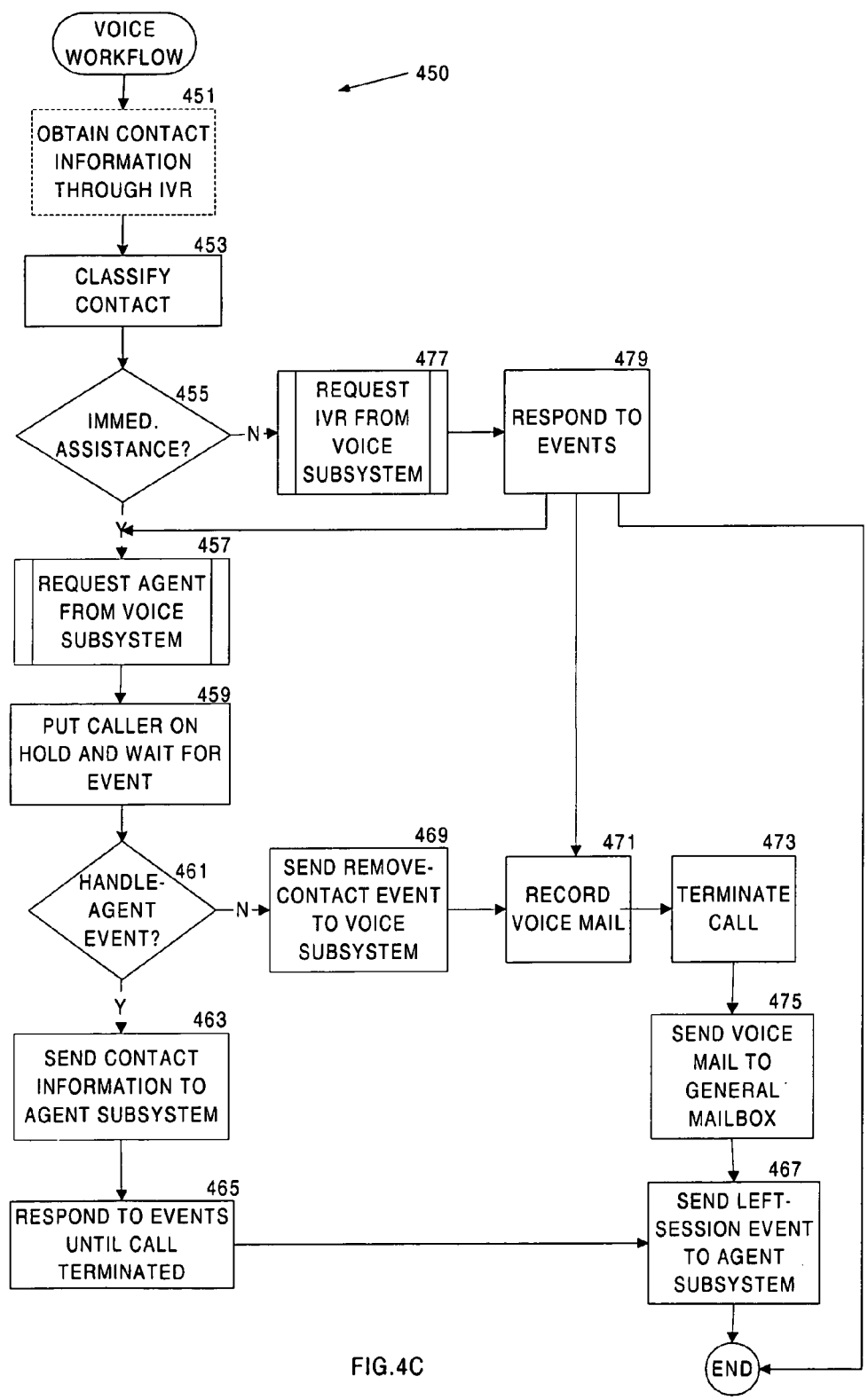

As shown in FIG. 3A, the voice components receive a voice phone call and direct it to either an agent for immediate assistance 305 or to an interactive voice response system 301 for self-service. If directed initially to an agent 305, the workflow engine may de-escalate the contact (represented by arrow 311) to voice mail 303 if an agent is not available within a given period of time. In addition, the workflow engine may de-escalate an immediate assistance contact (represented by arrow 313) to interactive voice response (IVR) 301 if the call priority is less than a predetermined amount or if the caller chooses self-service. A self-service contact may be escalated by a voice mail manager (represented by arrow 309) if the user chooses to leave voice mail. Alternatively, when a self-service contact requests active assistance from an agent, the workflow engine 201 and the dynamic ACD 241 escalate the contact into the immediate assistance 305 as represented by arrow 307. In an embodiment in which the voice mail recording is attached to an email for subsequent processing by an agent, the email with the voice mail attachment may be escalated through a combination of the email escalator, the workflow engine, and the dynamic ACD (represented by arrow 315) as explained below in conjunction with FIGS. 3B and 5A–C.

Turning now to FIGS. 4A–C, the flowchart in FIG. 4A illustrates the acts performed by the voice router 223 component when executing a voice router method 400. The voice router method 400 receives notification of a call from the voice server 222 (block 401). As part of the information received from the gateway, the voice router method 400 receives the originating and destination phone numbers for the call, which it then sends to the voice subsystem 213 (block 403). The voice subsystem determines how to route the call, as will be described further below, and sends the routing information to the voice router. The voice router method 400 receives the routing information (block 405) and then sends the routing information to the voice server 222 for routing (block 407).

Turning now to FIG. 4B, a voice subsystem method 420 executed by the voice subsystem component 213 is described. The voice subsystem method 420 receives the originating and destination phone numbers from the voice router (block 421), collects additional contact information and creates a contact record for the contact (block 423). The voice subsystem method 420 then evokes an appropriate voice workflow for the contact from the workflow engine 201 (block 425). One of the steps within the voice workflow will be the determination of service tier, i.e., immediate assistance or a self-service. Assuming the contact is a self-service contact, the voice subsystem method 420 receives an IVR request from the voice workflow at block 427 and then sends the IVR information to the voice recorder at block 429 so that the voice router will route the voice call to interactive voice response. On the other hand, if the workflow determines that the contact is an immediate assistance contact (block 431), the voice subsystem method 420 receives an agent request from the workflow and requests an agent from the dynamic ACD (block 433) in response. The dynamic ACD attempts to match an agent with the contact as previously described. Assuming no agent is available within a pre-determined period of time, the workflow causes additional options to be presented to the contact. In one instance, the contact may choose to be routed to voice mail, at which point the workflow engine sends a remove-contact event to the voice subsystem method 420, which is received at block 435. In response, the voice subsystem method 420 requests that the contact be removed from the list by the dynamic ACD (block 437). If, however, an agent is available, the dynamic ACD sends the agent information to the voice subsystem method 420, which in turn sends the agent information to the voice router (block 439) so that the voice router may appropriately route the contact to the chosen agent. The voice subsystem method 420 continues to monitor the contact to determine if the call is answered within a reasonable period of time (block 441). If it is, then the voice subsystem method 420 injects a handle-agent event into voice workflow at block 443 so that the workflow will continue to handle the contact as explained further below. Alternatively, if the call is not answered, the voice subsystem method 420 returns to block 433 and requests another agent from the dynamic ACD. In one embodiment, the voice subsystem method 420 generates events which create and update contact information regarding the voice call in the database 231.

FIG. 4C illustrates one embodiment of a voice workflow 450 that is executed by the workflow logic 207 for a voice contact. When the voice workflow 450 is initiated, it obtains contact information through the IVR process at block 451 (shown in phantom) if it is unable to determine the contact information from the originating phone number. The contact is classified based on its information at block 453. A determination is made as to the level of service to be given to this contact (block 455). If the contact is not entitled to immediate assistance, the voice workflow 450 requests the contact be routed to the IVR system by the voice subsystem (block 477). The voice workflow 450 continues to monitor the contact because a contact at the IVR self-service tier 301 may choose to leave a voice mail or wait for an agent during the IVR session by inputting certain digits. The input digits are captured as events by the voice workflow 450 at block 479 and, depending on the event, the voice workflow 450 escalates the contact to the deferred assistance tier 303 by transferring the contact into the voice mail system (block 471) or to the immediate assistance tier 305 by requesting an agent for the contact (block 457). In one embodiment, the email system manager serves as the voice mail manager and the processing represented by block 471 is performed by the workflow. The workflow records the contact's message, attaches the recording to an email message addressed to a general mailbox, and sends the email to the email subsystem 217 for transmission to the email server 226.

If the contact is entitled to immediate assistance, an agent is requested from the voice subsystem at block 457 and the caller is put on hold to wait for events from the voice subsystem (block 459). If a handle-agent event is injected into the voice workflow 450 by the voice subsystem because an agent allocated to this contact has answered the phone, the handle-agent event is detected at block 461 and contact information is sent to the voice subsystem (block 463). The voice workflow 450 then loops waiting for events and responding appropriately to those events, including updating the contact record, until the call is terminated as represented by block 465. Once the call is terminated, the voice workflow 450 sends a left-session event to the agent subsystem at block 467 that causes the agent to become available to receive a new contact.

If the contact chooses to be sent to voice mail prior to being routed to an agent (block 461), the voice workflow 450 sends a remove-contact event to the voice subsystem at block 469 to remove the contact from the list managed by the dynamic ACD. The voice workflow 4501 transfers the contact to the voice mail manager to record the message (block 471) and terminates the call after the messages is recorded (block 473). The voice mail is then sent to a general mailbox to be acted upon by an agent at a later point (block 475). In one embodiment, the voice message is attached to an email message and placed into the mailbox by the email system.

Referring now to FIG. 3B and FIGS. 5A–C, the email escalator component of the multimedia contact center 200 is described. As shown in FIG. 3B, a deferred email 323 is escalated into a high priority email 325 through a combination of the email escalator, the workflow engine, and the dynamic ACD (represented as arrow 327). Alternatively, an email message may be handled through an automatic response option in the conventional email system and such an email is de-escalated by the email server 226 (represented as arrow 329) into an auto response contact 321. As automatic response options are common in conventional email systems, the de-escalation process is not further described.

Figure 5A:
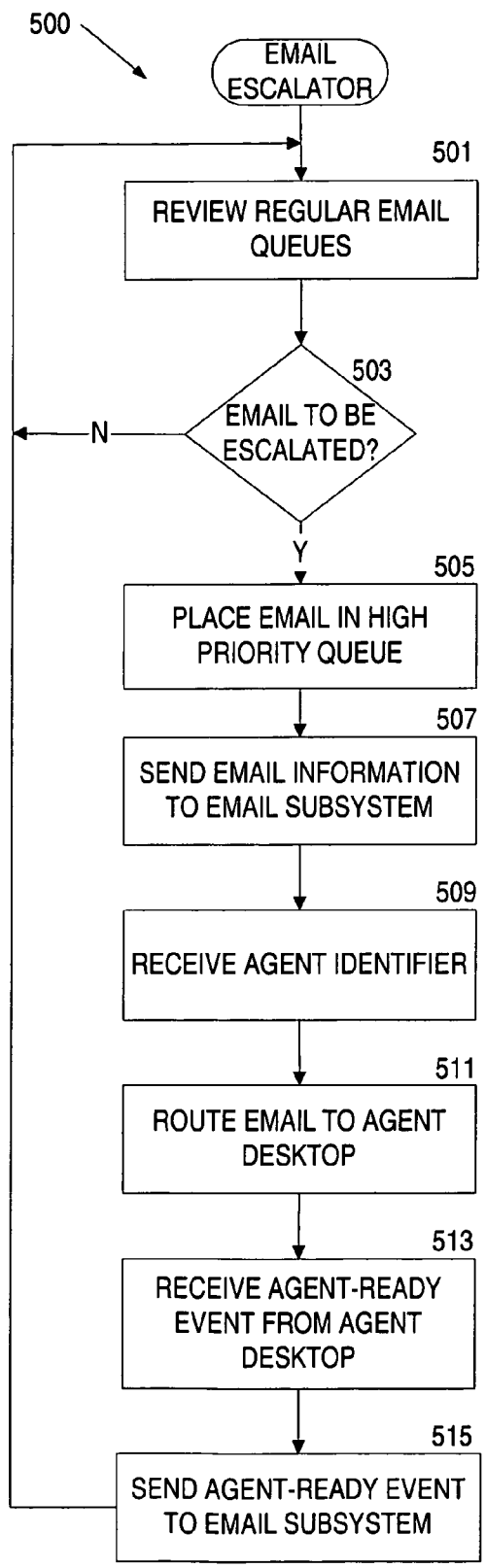
FIGS. 5A–C are flowcharts of method to be performed by escalated email components in the embodiment of the digital multimedia contact center shown in FIG. 2.
Figure 5B:
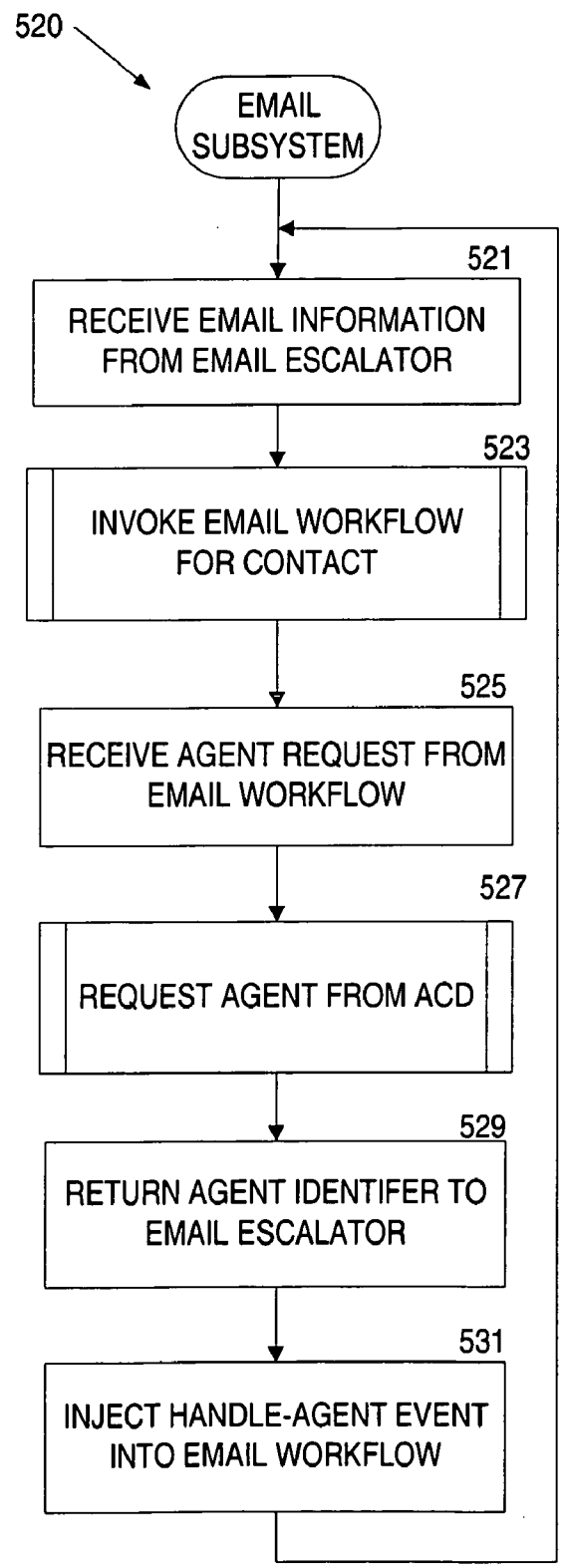

FIG. 5A illustrates an email escalator method 500 performed by the email escalator 227. The email escalator method 500 constantly reviews the email system mailboxes or queues (block 501) to determine if any pending emails should be escalated based on factors previously described. If an email is to be escalated (block 503), it is placed in a high priority queue (block 505) and the email information is sent to the email subsystem 217 at block 507. As will be explained in conjunction with FIG. 5B, the email subsystem 217 matches the contact to an agent and returns the agent identifier, which is received by the email escalator method 500 at block 509. The email escalator method 500 routes the email (via the email system) to the agent desktop (block 511) as a foreground task. In one embodiment, the email is presented on the desktop already opened. Once the agent has determined that he or she is ready to handle the email, the email escalator method 500 receives an agent-ready event from the agent desktop (block 513) and sends that event to the email subsystem at block 515. The agent workflow will not assign the agent to any other contacts until the email is handled. In another embodiment, the email escalator method 500 instructs the email subsystem to identify an email that is close to being escalated and to give the agent a visual clue, such as color or a special icon, that the email must be handled immediately.

A component acting as the email subsystem 217 executes a email subsystem method 520 to perform the functions illustrated in FIG. 5D. The email subsystem method 520 receives the email information from the email escalator at block 521 and invokes the workflow logic 207 at block 523. In one embodiment, when the email subsystem method 520 receives the email information at block 523, it creates the contact record for the email and marks it as escalated. In an alternate embodiment, the email manager a contact record is created for each email received at the contact center and the email subsystem method 520 marks the existing contact record as escalated at block 523.

The workflow requests an agent from the email subsystem at block 525. The email subsystem method 520 requests the agent from the dynamic ACD at block 527. When an agent is allocated to the contact, the agent identifier is returned from the dynamic ACD to the email subsystem method 520, which, in turn, at block 529 returns the agent identifier to the email escalator to cause the contact to be routed to be identified agent. The email subsystem method 520 injects a handle-agent event into the email workflow at block 531 in response to receiving the agent-ready event from the email escalator. In one embodiment, the email subsystem method 520 generates events which create and update contact information regarding the escalated email in the database 231.

Figure 5C:
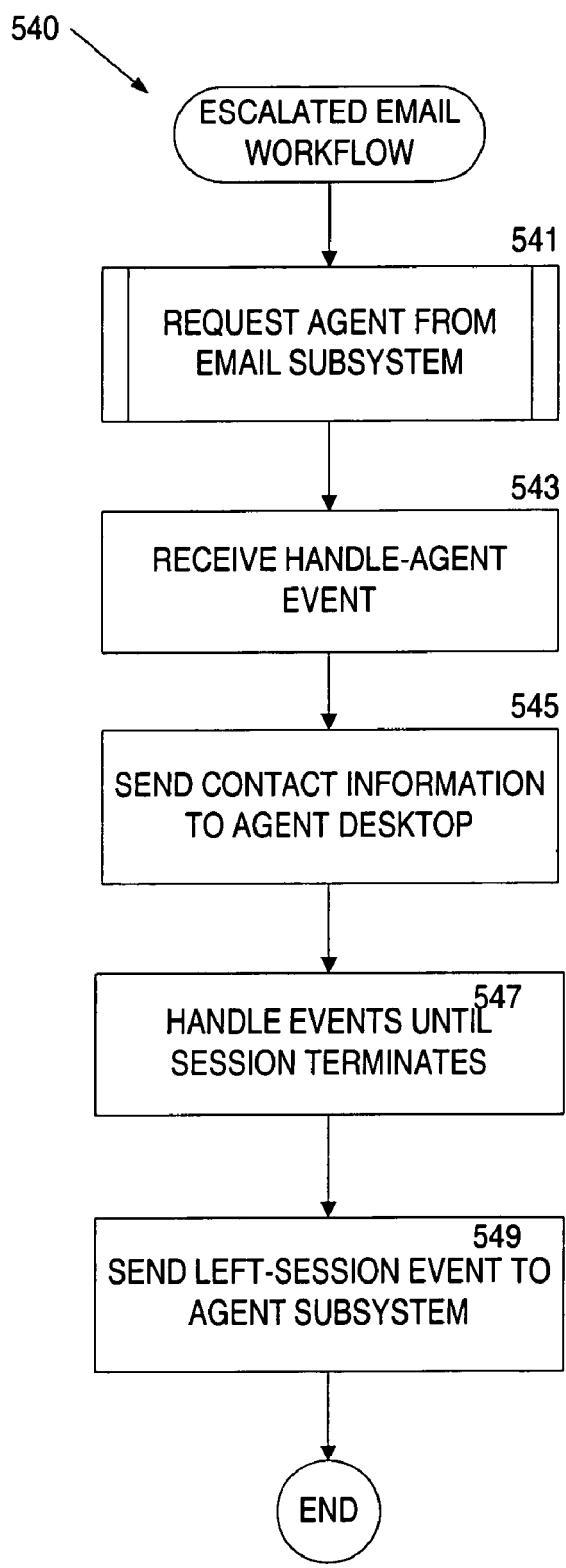

A method 540 for a contact workflow for an escalated email is illustrated in FIG. 5C. When the escalated email workflow 540 begins, it requests an agent from the email system at block 541, which causes the events previously described to occur. When the escalated email workflow 540 receives the handle-agent event at block 543, the workflow sends the email to the agent desktop at block 545 via the agent subsystem 219. As the agent is working with the escalated email message, the agent may generate events that cause the escalated email workflow 540 to perform certain functions, including updating the contact record, represented generally at block 547. When the agent is finished with the escalated email message, the escalated email workflow 540 sends a left-session event to the agent subsystem at block 549.

FIG. 3C illustrates the escalation that is performed for a contact that initially appears at the contact center 200 through a self-service Web site 341. By choosing to send an email, the contact can be escalated (represented by arrow 349) through the email manager into a deferred email contact 343. Alternatively, if the contact clicks on a collaboration/chat button, it is escalated by a combination of the workflow engine and the dynamic ACD (represented by arrow 347) into an immediate assistance contact 345. As the sending of email is handled by the conventional email system, the escalation from a self-service contact 341 into a deferred email contact 343 is not further discussed.

Figure 6A:
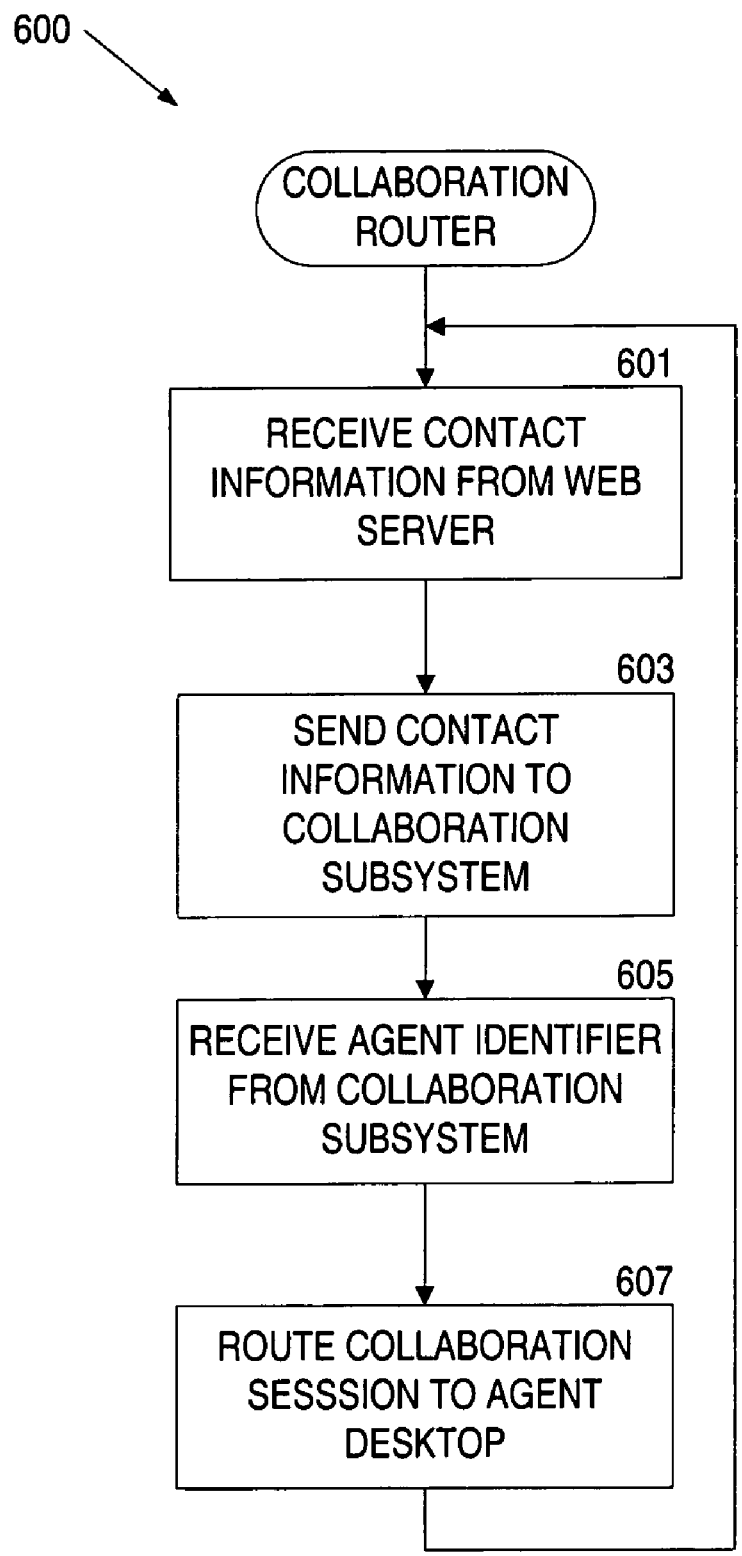
FIGS. 6A–C are flowcharts of method to be performed by collaboration components in the embodiment of the digital multimedia contact center shown in FIG. 2.
Figure 6B:
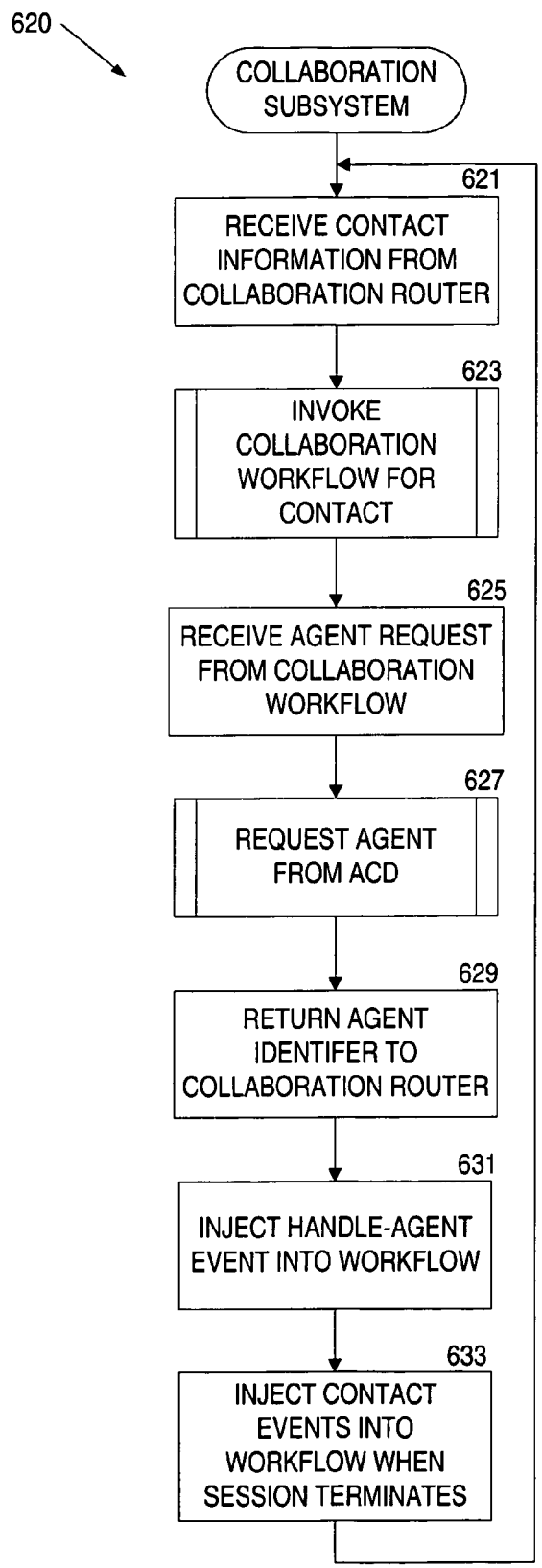
Figure 6C:
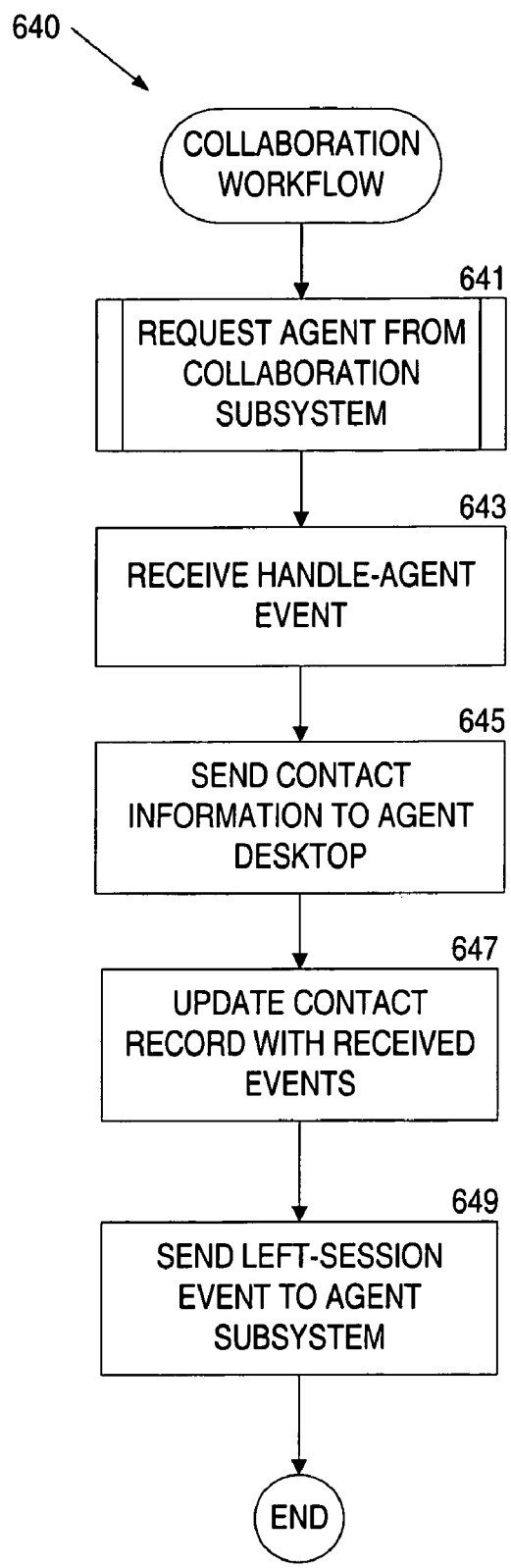

Turning now to FIGS. 6A–C, the escalation of a contact from a self-service Web contact 341 to an immediate assistance collaboration contact 345 is described beginning with collaboration router method 600 performed by the collaboration router 325. The collaboration router method 600 receives the contact information from the web server (block 601) and sends the contact information to the collaboration subsystem 215 (block 603) to have an agent allocated to the contact. When the collaboration router method 600 receives the agent identifier from the collaboration subsystem at block 605, then routes the collaboration session to the agent desktop for the identified agent (block 607) via the collaboration server.

A collaboration subsystem method 620 executed by the collaboration subsystem 215 is next described in conjunction with FIG. 6D. The collaboration subsystem method 620 receives the contact information from the collaboration router at block 621 and invokes a collaboration workflow for the contact at block 623. A contact record for the collaboration contact is also created at block 623. The collaboration subsystem method 620 receives an agent request from the collaboration workflow (block 625) and requests an agent from the dynamic ACD (block 627). When the dynamic ACD returns the agent identifier to the collaboration subsystem method 620, it returns the agent identifier to the collaboration router (block 629) for routing the collaboration session to the appropriate agent's desktop. The collaboration subsystem method 620 also injects a handle-agent event into the collaboration workflow at block 623. Events resulting from the collaboration session are injected into the workflow by the collaboration subsystem method 620 when the session terminates (block 633). In one embodiment, the collaboration subsystem method 620 generates events which create and update contact information regarding the collaboration session in the database 231.

Turning now to FIG. 6C, a collaboration workflow method 640 that is executed by the workflow logic 207 as a collaboration workflow for a contact is described. When the collaboration workflow method 640 begins, it requests an agent from the collaboration subsystem at block 641. The collaboration workflow method 640 receives a handle-agent event from the collaboration subsystem at block 643. The handle-agent event informs the workflow that the agent is now ready for the collaboration session and collaboration workflow method 640 sends the contact information to the agent desktop (block 645) via the agent 219 subsystem. The collaboration workflow method 640 updates the contact record with the events received from the collaboration subsystem when the session is terminated (block 647). The collaboration workflow method 640 also sends a left-session event into the agent subsystem at block 649.

Figure 7A:
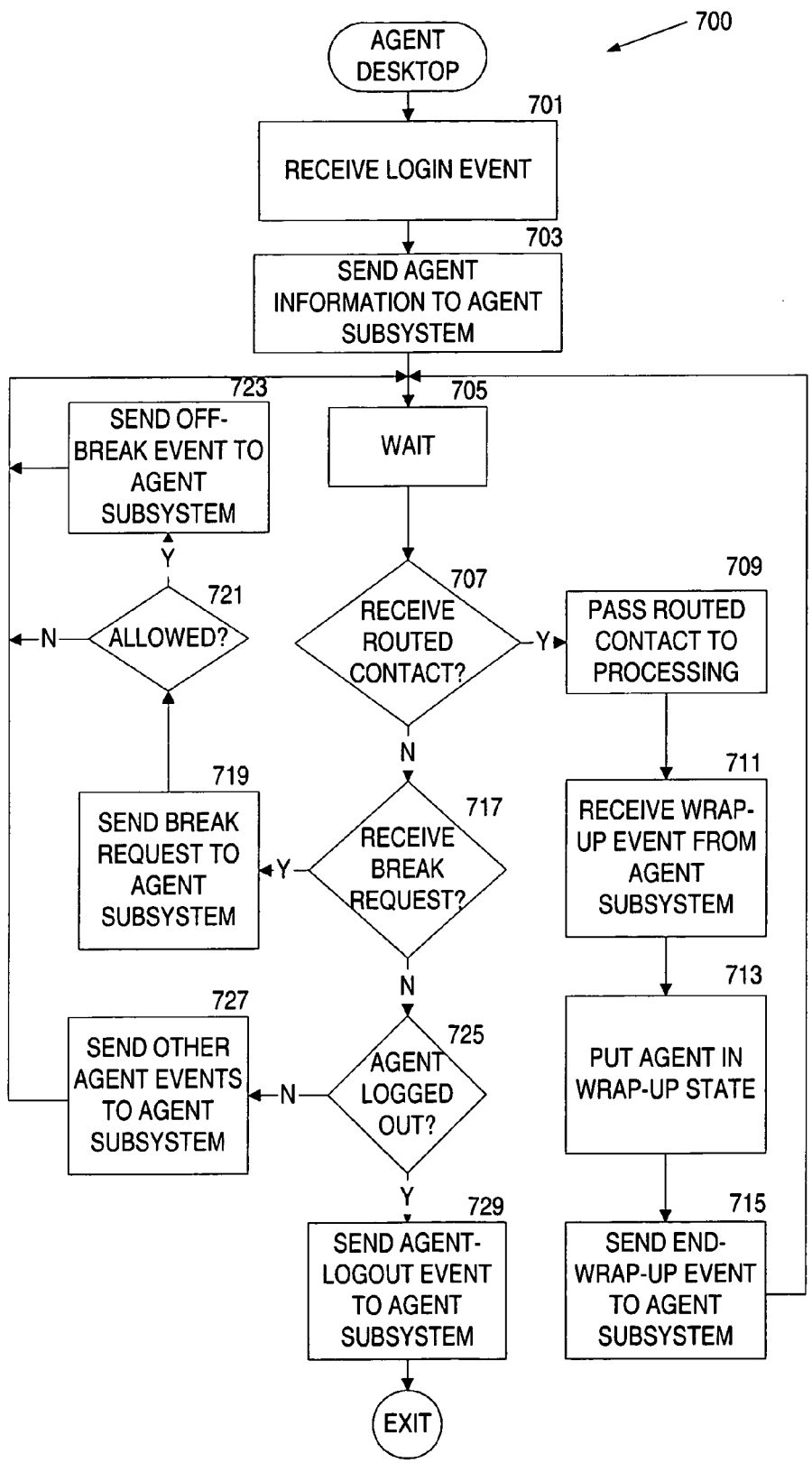
FIGS. 7A–C are flowcharts of method to be performed by agent components in the embodiment of the digital multimedia contact center shown in FIG. 2.

The methods used by the multimedia contact center 200 for agents are now described with reference to the flowcharts in FIGS. 7A–C. FIG. 7A illustrates an agent desktop method 700 that presents tasks on an agent desktop 229. The agent desktop method 700 receives a login event when an agent logs into the contact center (block 701). The agent desktop method 700 sends the agent information into the agent subsystem 219 at block 703. As part of their processing, the agent subsystem 219 and the agent workflow 207 make the agent available for contacts. The agent desktop method 700 waits for messages from the agent and the agent subsystem at block 705. If the agent desktop method 700 receives the routed contacts (block 707), it passes the contact information onto to appropriate underlying system (such as the email system and the collaboration system) at block 709. When the appropriate system has terminated the contact, the agent desktop method 700 receives a wrap-up event from the agent subsystem (block 711), which causes it to put the agent into a wrap-up state (block 713). The agent desktop method 700 sends an end-of-wrap up event to the agent subsystem at block 715 when the agent has finished the contact wrap up procedures.

The agent desktop method 700 also handles the transition of the agent into various states such as break, logout, etc. If the agent is requesting a break (block 717), the agent desktop method 700 sends the break request to the agent subsystem (block 719), which forwards it onto the agent workflow for a decision (as described further below). If the break request is allowed (block 721), the agent desktop method 700 waits for the agent to return from break and sends an off-break event to the agent subsystem to inform it that the agent is again available (block 723).

If the agent is logging out (block 725), the agent desktop method 700 sends an agent-logout event into the agent subsystem at block 729. All other messages are sent to the agent subsystem at block 727. One of skill in the art will readily understand the processing necessary to transition the agent into other states without further illustration.

Figures 1, 7B:
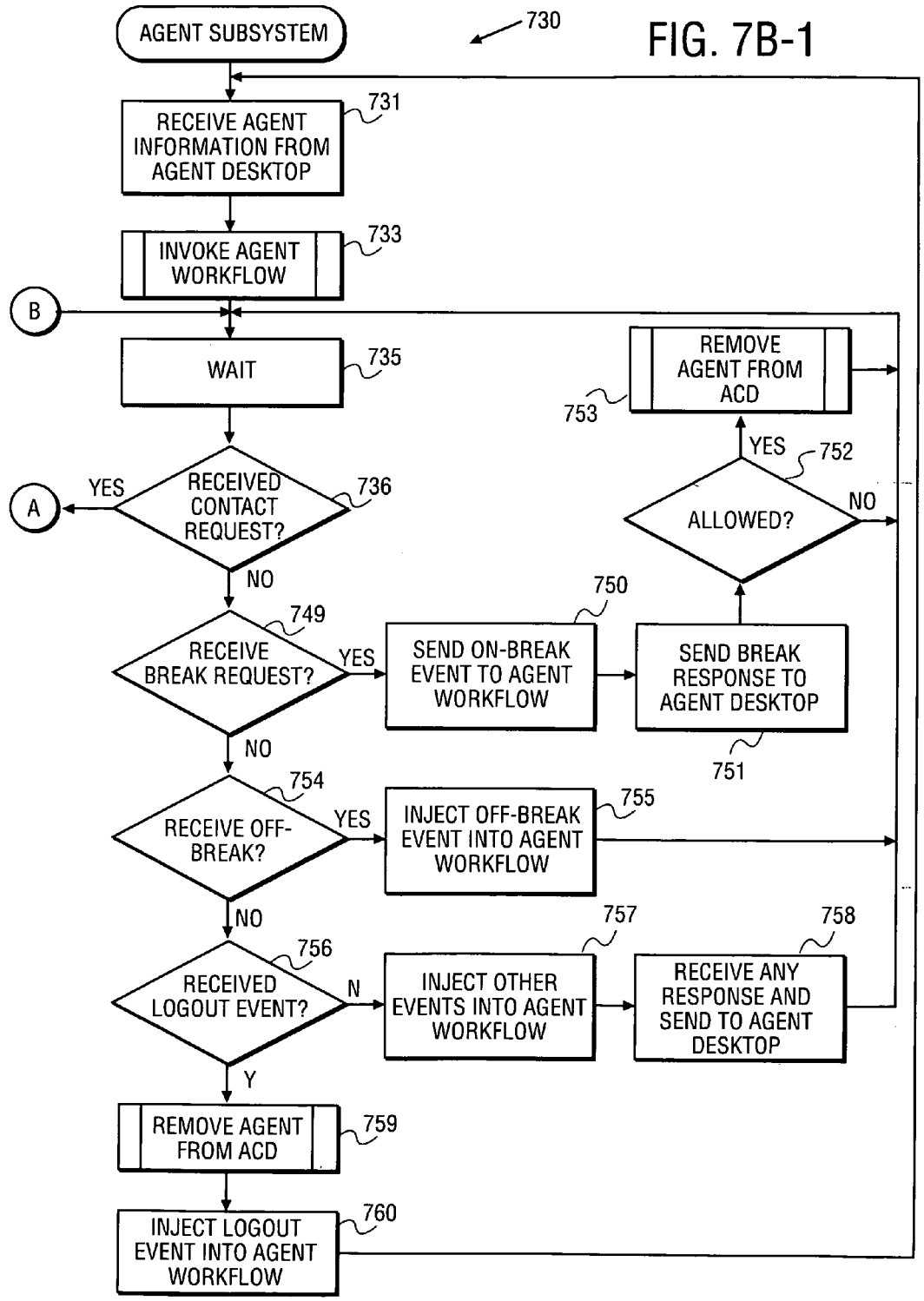
Figures 2, 7B:
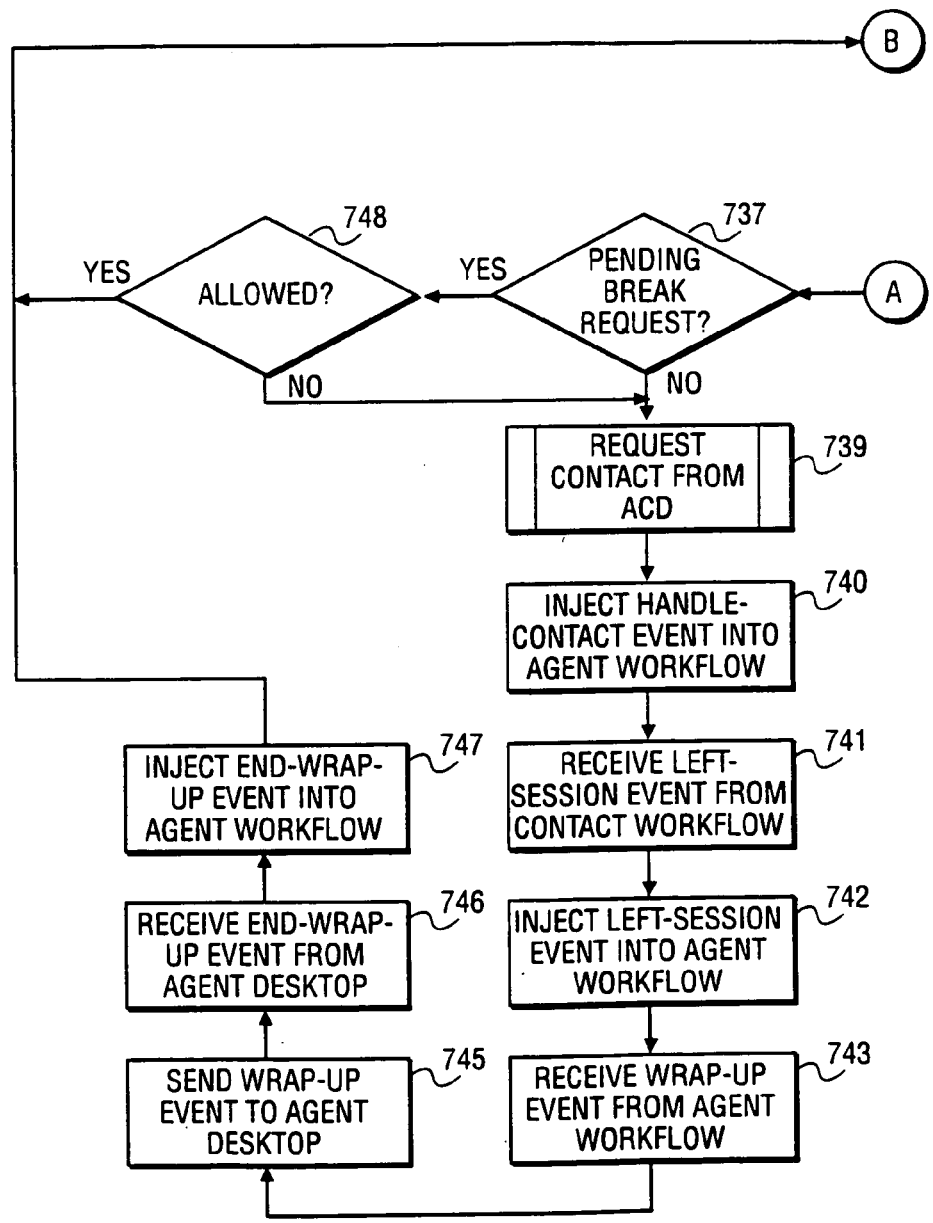

Referring now to FIG. 7B, an agent subsystem method 730 executed by the component acting as the agent subsystem 219 is described. The agent information is received from the agent desktop at block 731 when the agent logs into the contact center. The agent subsystem method 730 invokes an agent workflow from the workflow engine 201 at block 733 and waits for events from the agent workflow and the agent desktop 229 (block 735). If the event is a contact request from the agent workflow (block 736), the agent subsystem method 730 checks to see if there is a pending break request from the agent desktop (block 737). If not, the agent subsystem method 730 requests a contact for the agent from the dynamic ACD at block 739. Once the dynamic ACD returns a contact, the agent subsystem method 730 injects a handle contact event into the agent workflow (block 740). When the agent or the contact terminates the call or the session, the agent subsystem method 730 receives a left-session event from the corresponding contact workflow, i.e., the voice workflow, the email workflow, or the collaboration workflow, at block 741, and injects the event into the agent workflow at block 742. The agent subsystem method 730, in conjunction with the current session or call, also receives a wrap-up event from the agent workflow (block 743), which it sends to the agent desktop (block 745). When the agent desktop has determined that the agent is completely wrapped up the contact, the agent subsystem method 730 receives the end-wrap-up event from the agent desktop at block 746, and in turn, injects the event into the agent workflow at block 747. If a break request is pending (block 737), the agent subsystem method 730 waits until the agent workflow makes a decision on the break request (block 748). If allowed, the agent subsystem method 730 waits at block 735 for an off-break event from the agent desktop. If not allowed, the agent subsystem method 730 requests a contact from the dynamic ACD at block 739.

If the agent subsystem method 730 receives a break request from the agent desktop (block 749), it sends an on-break event to the agent workflow (block 770) and waits for a response, which it forwards to the agent desktop at block 751. If the break is allowed by the agent workflow (block 752), the agent subsystem method 730 requests the agent be removed from the agent list by the dynamic ACD at block 753 and waits a block 735 for an off-break event from the agent desktop. When the off-break event is received (block 754), the agent subsystem method 720 injects the off-break event into the agent workflow at block 755 to cause the workflow to request a contact for the now-available agent.

If a logout event is received (block 756), the agent subsystem method 730 requests the agent be removed from the agent list by the dynamic ACD (block 759) and injects a logout event into the agent workflow (block 760). The handling of other events is illustrated generically at block 757, where the event is injected into the agent workflow, and at block 758, where the agent subsystem method 730 forwards any response received from the agent workflow to the agent desktop. One of skill in the art will readily understand the processing necessary to handle different types of events without further illustration.

Figure 7C:
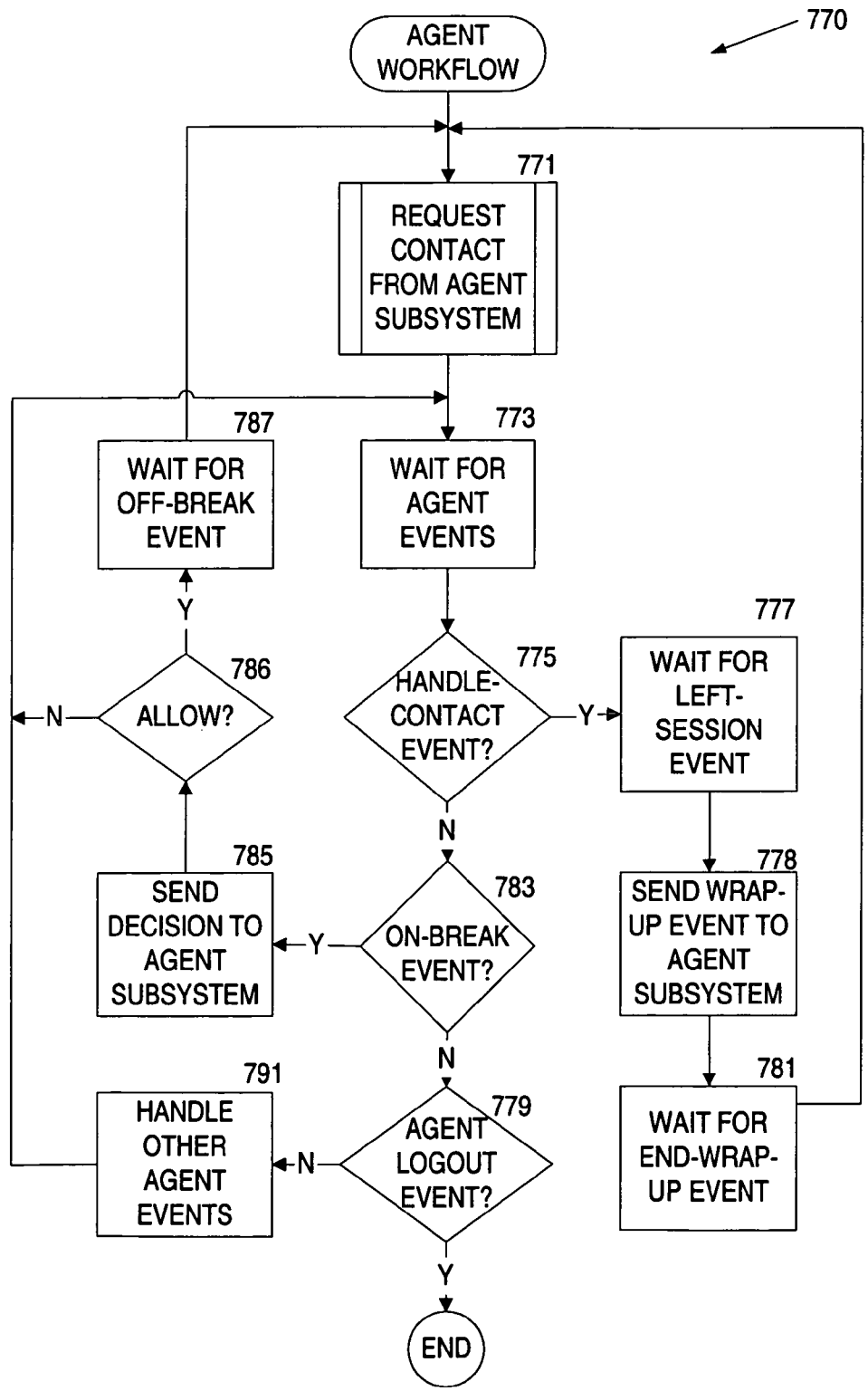

An agent workflow method 770 for an agent workflow is now described in conjunction with FIG. 7C. The agent workflow method 770 begins by requesting a contact for the agent from the agent subsystem at block 771. The agent workflow method 770 then waits for agent events at block 773. If a handle-contact event is received (block 753), the agent has been allocated to a contact and the agent workflow method 770 waits for a left-session event from the corresponding contact workflow that indicates the contact session has terminated (block 777). When the left-session event arrives, the agent workflow method 770 sends a wrap-up event to the agent subsystem at block 778 and waits for an end-wrap-up event that indicates the agent is now available (block 781). The agent workflow method 770 loops back to block 771 to request a new contact for the agent.

If an on-break event is received by the agent workflow method 770 (block 761), the agent workflow method 770 determines if the break can be allowed based on the status of the call center (block 785). In either case, a message is sent to the agent subsystem to notify the agent desktop of the decision (block 785). If the break is allowed (block 785), the agent workflow waits for an off-break event to be received at block 786. If the break is not allowed, the agent workflow method 770 loops to block 773 to wait for a contact.

If an agent logout event is received by the agent workflow method 770 (block 779), the agent workflow method 770 terminates. In an embodiment not shown, the agent logout event is a request that can be denied based on the state of the contact center, such as when the contact center is overloaded, or allowed at an appropriate time, such as when the agent workflow requests a new contact. All other events are handled by the agent workflow method 770 as generically illustrated by block 791. One of skill in the art will readily understand the processing necessary to handle different types of events within an agent workflow without further illustration.

It will be appreciated that the workflows described in conjunction with the flow charts 4C, 5C, 6C and 7C are simplified examples of the actions available through the workflow logic 207 and are not intended to limit the invention to only those actions and sequences illustrated. A detailed description of one embodiment of the workflow logic 207 and the workflow actions is given in the next section.

In addition, one of skill in the art will readily conceive of alternate logic flows with more or fewer processes or different processes that achieve the results of these method and such alternatives are considered within the scope of the invention. For example, instead of having the contact workflows inject the left-session events directly into the agent workflow, in one alternate embodiment, the contact workflow sends a contact-ended event to the contact subsystem and thence to the appropriate media router, which causes the router to send the left-session event to the agent subsystem for injection into the agent workflow. In another alternate embodiment, the termination of the contact workflow causes the contact subsystem to send the contact-ended event to the appropriate media router, causing the router to send the left-session event to the agent subsystem and thence to the agent workflow.

The particular methods performed by components of one embodiment of the digital multimedia contact center of the present invention have been described in terms of media-specific processing diagrams and flowcharts. The methods performed by a voice router, a voice subsystem, and workflow logic for a voice contact have been shown by reference to flowcharts 4A–C including all the acts from 401 until 407, from 421 until 443, and from 451 until 475, respectively. The methods performed by an email escalator, an email subsystem, and workflow logic for an escalated email contact have been shown by reference to flowcharts 5A–C including all the acts from 501 until 515, from 521 until 531, and from 541 until 549, respectively. The methods performed by a collaboration router, a collaboration subsystem, and workflow logic for a collaboration contact have been shown by reference to flowcharts 6A–C including all the acts from 601 until 607, from 621 until 633, and from 641 until 649, respectively. The methods performed by an agent desktop, an agent subsystem and workflow logic for an agent have been shown by reference to flowcharts 7A–C including all the acts from 701 until 729, from 731 until 760, and from 771 until 791, respectively.

Internet Contact Center (iCC) Implementation

In this section of the detailed description, a particular implementation of the invention is described. Companies subscribe to the services of the iCC to manage their customer contacts. The iCC is sited remotely from the agents for the subscriber, who may be at various locations. The agent desktops 229 are Web browser-based that connect to the agent subsystem(s) 219 in the remote iCC. The subscriber's customers contact the iCC directly through the Internet or POTS and are then routed to the appropriate agent desktop through a virtual private network. The browser-based agent desktops enables the use of various plug-in applets that extend the basic capabilities of the agent desktop without extensive re-programming. Additionally, a combination Java applet/servlet can be used to implement the desktop manager described previously.

Messaging

Communication between the workflow engine 201 and the media routers 221/agent desktop 229 is handled through a set of interfaces using Java RMI (remote method invocation). Three generic interfaces are provided in a messaging library. All contact workflow subsystems, e.g., voice subsystem 213, collaboration subsystem 215 and email subsystem 217, are required to implement at least a generic contact service interface, such as "ContactWorkflowServiceInterface" described below. All agent workflow subsystems, e.g. the agent subsystem 219, are required to implement at least a generic agent service interface, such as "AgentWorkflowServiceInterface" described below Each media router 221 is required to implement at least a generic media router interface, such as "MediaRouterInterface" described below. New interfaces specific to the service requested can be defined that inherit from existing interfaces. Thus, for example, a voice service interface implements the generic contact service interface along with interfaces for telephony commands. Global variables pass information between the workflow subsystems 205 and the workflow logic 207. The global variables contain the values needed by the workflow logic 207 in the context of a particular workflow, and requests made by the workflow logic 207 to the workflow subsystems 205 through various workflow steps described further below.

A media router 221 uses the ContactWorkflowServiceInterface of a particular contact workflow subsystem to 1) start a contact workflow and receive a contact identifier for the workflow, 2) inject an event into an existing workflow identified by a contact identifier, and 3) determine if the contact workflow subsystem is handling a specified contact. To start a workflow for a contact, a media router 221 invokes a "startWorkflow" method in the ContactWorkflowServiceInterface of the desired contact workflow subsystem, passing in an identifier for the media router interface of the media router (client), and the attributes of the contact (attributes), and receives an identifier for the newly created contact workflow in return (contactID), e.g., startWorkflow(client, contactID, attributes).

To inject an event into an existing workflow, a media router 221 invokes an "injectEvent" method in the ContactWorkflowServiceInterface of the appropriate contact workflow subsystem, identifying the contact workflow (contactID) and the event to be injected into the workflow (event), e.g., injectEvent(contactID, event).

To determine if a particular contact workflow subsystem is handling a specific contact, a media router calls a "handlesContact" method in the ContactWorkflowServiceInterface of the contact workflow subsystem, passing in the identifier of the contact workflow (contactID) and receives a boolean value in return, e.g., handlesContact(contactId).

An agent desktop 229 uses the AgentWorkflowServiceInterface to 1) start an agent workflow and receive an agent identifier for the workflow, 2) inject an event into an existing workflow identified by an agent identifier, and 3) determine if a particular agent workflow subsystem is managing a specified agent. As described previously, when multiple agent workflow subsystem are present, an agent desktop is assigned to one of the agent workflow subsystems by a service manager. To start an agent workflow, an agent desktop invokes a "startWorkflow" method in theAgentWorkflowServiceInterface of the appropriate agent workflow subsystem, passing in the attributes of the agent (attributes), and receives an identifier for the newly created agent workflow in return (agentID), e.g., startWorkflow(agentID, attributes).

To inject an event into an existing workflow, an agent desktop invokes an "injectEvent" method in the AgentWorkflowServiceInterface of the appropriate agent workflow subsystem, identifying the agent workflow (agentID) and the event to be injected into the workflow (event), e.g., injectEvent(agentID, event).

To determine if a particular agent workflow subsystem is handling a specific agent, an agent desktop calls a "handlesAgent" method in the AgentWorkflowServiceInterface of the agent workflow subsystem, passing in the identifier of the agent workflow (agentID) and receives a boolean value in return, e.g., handlesAgent(agentId).

The MediaRouterInterface allows contact workflow subsystems to route contacts to the agents allocated by the dynamic ACD and to terminate a contact session. To route a contact to an agent, a contact workflow subsystem invokes an "assignContactToAgent" method in the MediaRouterInterface of the appropriate media router, passing in the workflow identifier for the contact (contactID) and the workflow identifier for the agent (agentID) and receiving a boolean in return that indicates whether the routing was successful, e.g., assignContactToAgent(contactID, agentID).

To terminate a contact session, a contact workflow subsystem invokes a "terminateContact" method in the iCC-MediaRouterInterface of the appropriate media router, passing in the workflow identifier for the contact (contactID), e.g., terminateContact(contactID).

Database Unification Layer

The database unification layer 261 implements a unified schema consisting of information replicated from a number of different sources including the databases used by the third-party systems, and the internal iCC database 231 as described previously. Each different source is defined in a sub-schema including:

Billing

Customer Relationship Management (CRM)

Entitlement (Billing option, maximum agents, maximum contacts, . . . )

Provisioning (Agents, User IDs, Passwords, Classifications, Skills, Proficiencies, . . . )

Business Logic (Priority Expressions, Attributes, Stored Procedures, . . . )

Active State (Agent State, Session State, Contact State, Contact Center State, Customer State).

The database unification layer provides access to the information in the various databases through Java classes, such as CRM, Provisioning, Entitlement, Rules, Contact Detail Record (CDR), Contact Center State.

The unified schema is synchronized with the vendor-specific sources by a set of database triggers. For instance, many conventional email systems use event handlers that watch for messages entering and changing state, and create and update CDR records as necessary, e.g. when an email message is responded to or forwarded to another agent. Updating one of the sources with information in the unified schema is accomplished through the Java classes.

Figure 8A:
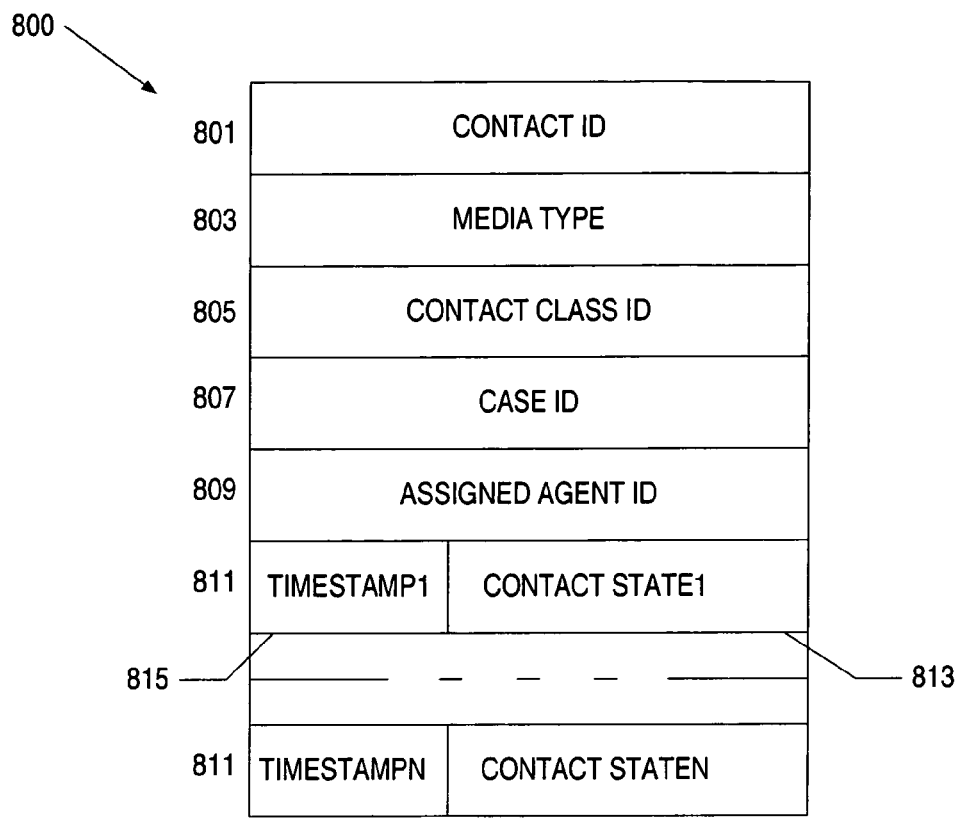
FIG. 8A is a diagram of a contact detail data structure for use in an implementation of the invention.

One embodiment of a data structure 800 for a CDR is illustrated in FIG. 8A. The contact represented by the CDR 800 is identified through a contact ID field 801. The media type through which the contact entered the iCC is specified in a media type field 803. Assuming the contact has been classified, the classification for the contact is stored in a contact class ID field 805. If the iCC is implemented in conjunction with a standard customer relationship management system, the CRM case identifier is stored in a case ID field 807 to allow tracking of the contact. The agent assigned to handle the contact is identified through an assigned agent ID field 809. One or more fields 811 collectively record the history of the contact as it is process in the iCC. Each field 811 contains a contact state 813 and a timestamp 815. Thus, the change in state of the contact can be tracked chronologically for the life of the contact. Exemplary contact states used by the iCC are shown in Table 1 below and it will be appreciated that more or fewer states may be used.

TABLE 1 iCC Contact States

| State | Comment |
|---|---|
| Initially Created | |
| Escalated | |
| Being Addressed | |
| On Hold | |
| Archived | after wrap-up |
| In Wrapup | |
| Terminated | no agent assigned |
| Abandoned | contact quits before being helped |
| Queued | |
| Demoted | |

Figure 8B:
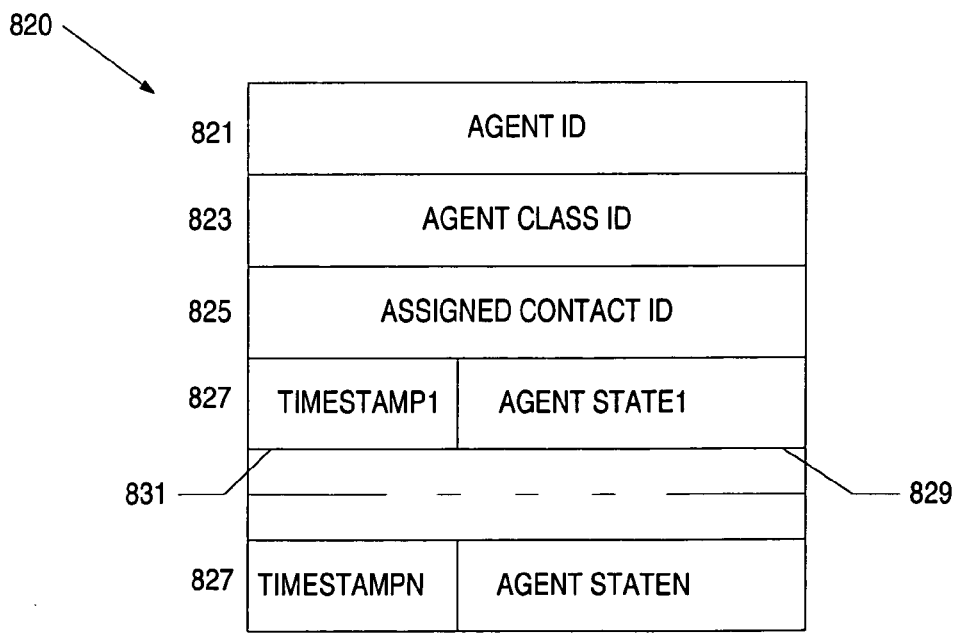
FIG. 8B is a diagram of an agent data structure for use in an implementation of the invention.

One embodiment of a data structure 820 for an agent record is illustrated in FIG. 8B. The agent represented by the agent record 820 is identified by an agent ID field 821. Assuming the agent has been classified, the classification for the agent is stored in an agent class ID field 823. The contact identifier for the current contact the agent is handling is stored in an assigned contact ID field 825. One or more fields 827 collectively record the history of the agent while he or she is logged into the iCC. Each field 827 contains an agent state 829 and a timestamp 831. Thus, the change in state of the agent can be tracked chronologically during the workday of the agent. The agent states used by the iCC are shown in Table 2 below and it will be appreciated that more or fewer states may be used.

TABLE 2 iCC Agent States

| State | Comment |
|---|---|
| Logged Out | |
| On Break | |
| Available | Logged in and not assigned a contact |
| Busy | |
| Wrap Up | Post-contact processing |

Soft ACD

The iCC uses a software-implemented ACD to manage the allocation of all contacts and agents. The Soft ACD exists as a set of stored procedures in the contact center database that refer to special database tables used as the unordered lists of available agents and waiting contacts. The unordered lists may be further logically subdivided, e.g., by classification.

The Soft ACD also loads business logic and provisioning information (described below) when required. Each classification within the organization (e.g., Sales, Support, Customer Service, etc.) is associated with a particular set of business logic. If any of this information changes, the Soft ACD is notified, it reloads this information, and immediately applies the new information to the iCC. While it is running, the Soft ACD maintains the state (classifications, requirements, and attributes) of each entry in the lists.

When a running workflow requests an agent or contact, the appropriate subsystem passes the request onto the Soft ACD as previously described. The Soft ACD determines the best match for the agent or contact by filtering the opposite list on classification and in light of any requirements specified in the request, and prioritizing the filtered entries using one or more "priority expressions." Each priority expression contains a set of weighted contact/agent attributes that produce a priority from 0 to 100 when an entry is evaluated. The attributes and their weights exist as classes in the business logic sub-schema in the database unification layer and are described next. It should be noted that the Soft ACD dynamically performs the filtering and prioritizing anew for each request for a match.

While a contact or agent is waiting on a list, the requesting workflow is free to continue executing, but when an actual allocation occurs, a resource allocator notifies the corresponding subsystem, which then interrupts the requesting workflow to route the contact.

Business Logic

The business logic used by the iCC for a subscriber is defined through an email manager, a workflow editor, and an administrative interface. The email manager is used to create email rules that route email contacts into various predefined mailboxes. These rules may reference text in the from, to, subject and body of the message as well as make database queries. Mailbox queues are separate message areas maintained by the email server. Agents retrieve messages from these queues. Individual queues can be set up, e.g., for each agent or for separate products, and additions or deletions to the existing set of queues can be made as necessary. For example, the subscriber could initially define one queue per product per classification ("SalesPrinters" or "SupportPrinters") and add more as business grows. The system administrator grants access to these queues on a per agent basis. An additional queue is defined for escalated email messages as previously described. After defining the queues, the rules which route messages into those queues are defined. Rules can also be specified that demote certain email messages into self-service by routing them to the auto-responder function.

The workflow editor defines a workflow for handling a contact or an agent. A subscriber may defined any number of agent and contact workflows through the workflow editor. For example, each agent might have a particular workflow based on the agent's login identifier. The workflows and their related invocation information are stored for reference by the workflow engine 201 in an LDAP directory server or other directory structure that defines hierarchical directory entries. For example, a subscriber might define the following hierarchy in which the entries at levels (a) and (b) are the invocation information for the workflows specified at levels (i).

```
1) asubscriber.com
    a) iCC
        i) configurations
            (1) wfVoice
                (a) 1234
                    (i) Workflow "SalesContact.WFE"
                (b) 1000
                    (i) Workflow "SupportContact.WFE"
            (2) wfEmail
                (a) sales@asubscriber.com
                    (i) Workflow "SalesContact.WFE"
                (b) support@asubscriber.com
                    (i) Workflow "SupportContact.WFE"
            (3) wfWebCollaboration
                (a) http://asubscriber.com/sales
                    (i) Workflow "SalesContact.WFE"
                (b) http://asubscriber.com/support
                    (i) Workflow "SupportContact.WFE"
```

The administrative interface uses the classes in the business logic sub-schema to define logins, passwords, agent skills and proficiencies, call center classifications, service level objectives, email overdue/escalation thresholds, priority expressions, attributes, attribute weightings, etc. When the administrative interface starts up, it reads the system and subscriber business logic from the database using the business logic classes. When entities are changed, the relevant data is written back to the database through these same business logic classes. The administrative interface presents the subscriber with various graphical user interface (GUI) screen to assist the user in defining the subscriber business logic.

Through one of the GUI screens, the subscriber sets up the call center classifications, which define gross distinctions between contacts or between agents. The same set of classifications is used for both contacts and agents. Within a particular classification, the subscriber defines service level objectives for each media type. Service level objectives are defined as the percentage of contacts of a particular media type which must be handled in a specific time. Thus, the GUI screen for defining service level objectives presents the user with a list of the media types, an input area for a percentage value, and an input area for an elapsed time value.

Each agent has a set of skills and a proficiency within each skill, which are specified and modified through the administrative interface. When a contact requests an agent, certain skills/proficiencies may be specified as contact requirements. The requirements may also include aging information for relaxing those requirements after a certain amount of time has elapsed without the contact being helped. For instance, the aging information might say that for the first 30 seconds a particular voice call will accept a proficiency of 5 for a particular skill, after 30 seconds a proficiency of 2 will be acceptable. This is referred to as "aging" a requirement.

The iCC comes pre-configured with a number of system defined attributes including:

TimeInQueue—the time a contact has been waiting for a resource (available through a database stored procedure and calculated on the fly by the Software ACD.)
IsEmail—is this contact an email?
IsVoice—is this contact a voice call?
IsCollaboration—is this contact a web collaboration?
MediaServiceLevel—percentage of contacts of this media type handled within the specified media-specific service objective
LastAgent—User ID of last agent this customer talked to.

Subscriber-defined attributes that determine a contact-agent match are specified through the administrative interface. Attribute characteristics include name, type (Call Center, Agent, Contact), value type (numeric, symbolic), values, default values, value normalization, and corresponding stored procedure. The subscriber defines the set of attributes using a GUI screen that prompts the user for input by displaying permitted choices or through visual clues, such as a choice of normalization curves. The stored procedure for an attribute calculates a value for the attribute when the attribute is used in a priority expression. The stored procedures can have been previously created or may be created when the attribute is created.

The agent and contact priority expressions are created through a graphical user interface that allows an administrator to drag-and-drop desired attributes into an expression and set their weighting through slider bars. There is one priority expression for agents and one for contacts within each classification. When a new priority expression is specified, a new stored procedure is generated in a database scripting language, such as PL/SQL, compiled, and added to the database. One exemplary priority expression is shown in the following pseudocode:

For each attribute:
Call the attribute's stored procedure passing ContactID and CustomerID;
If value returned is −1, use the attribute's default value;
If the attribute is symbolic, convert to a normalized value;
Multiply result by specified weighting and add this to the accumulated total.

For a more specific example, assume a subscriber specified two classifications "Sales" and "Support" and a contact attribute called "BusinessValue" (i.e., the value of this contact to the subscriber's business). For the Sales classification, the subscriber created a contact priority expression of:

$$BusinessValue*0.2+TimeInQueue*0.1+IsEmail*0.1+IsVoice*0.4+IsCollaboration*0.2$$

and for the Support classification, a contact priority expression of:

$$BusinessValue*0.1+TimeInQueue*0.1+IsEmail*0.1+IsVoice*0.6+IsCollaboration*0.1.$$

When the Soft ACD is prioritizing the waiting contacts for assignment to an agent, it evaluates the expression for each contact of the appropriate classification by calling the stored procedure associated with the BusinessValue attribute and multiplying the value returned by 0.2 for a Sales contact or 0.1 for a Support contact. The weighted business value of the contact is then added to the appropriately weighted values of the system defined attributes to calculate the priority for the contact.

The Soft ACD can prioritize each agent/contact before deciding on the appropriate match or alternately may employ an optimization scheme in which the first agent/contact that reaches a pre-determined priority value is chosen.

Provisioning Information

The underlying components of iCC must set up and configured before the center is ready for operation. The email manager allows administrators to define agents, agent passwords, mailboxes, as well as the rules by which contacts are routed to these mailboxes. An administration interface to the collaboration server is used to define agents, agent passwords, and agent extensions. The telephony server is set up by creating dial plans and associating phone numbers with applications, and agents with phone extensions.

Workflow Engine

The iCC uses workflows to process contact, manage agents, and control the overall contact center functions. Workflow steps are the basic building blocks of control in the iCC workflow engine. The workflow steps available to a designer depend on the type of workflow being developed. For example, voice workflow steps include answer, collect digits, and record. Exemplary agent workflow steps include allow break, handle contact, and wrap up. Some workflow steps are applicable to all contact workflows, such as classify contact, request agent, and deliver contact. Control steps, e.g. end, wait, and if, are available for all workflows, along with a send email step. Additional steps for the contact and agent workflows will be readily apparent to one of skill in the art.

Figure 9A:
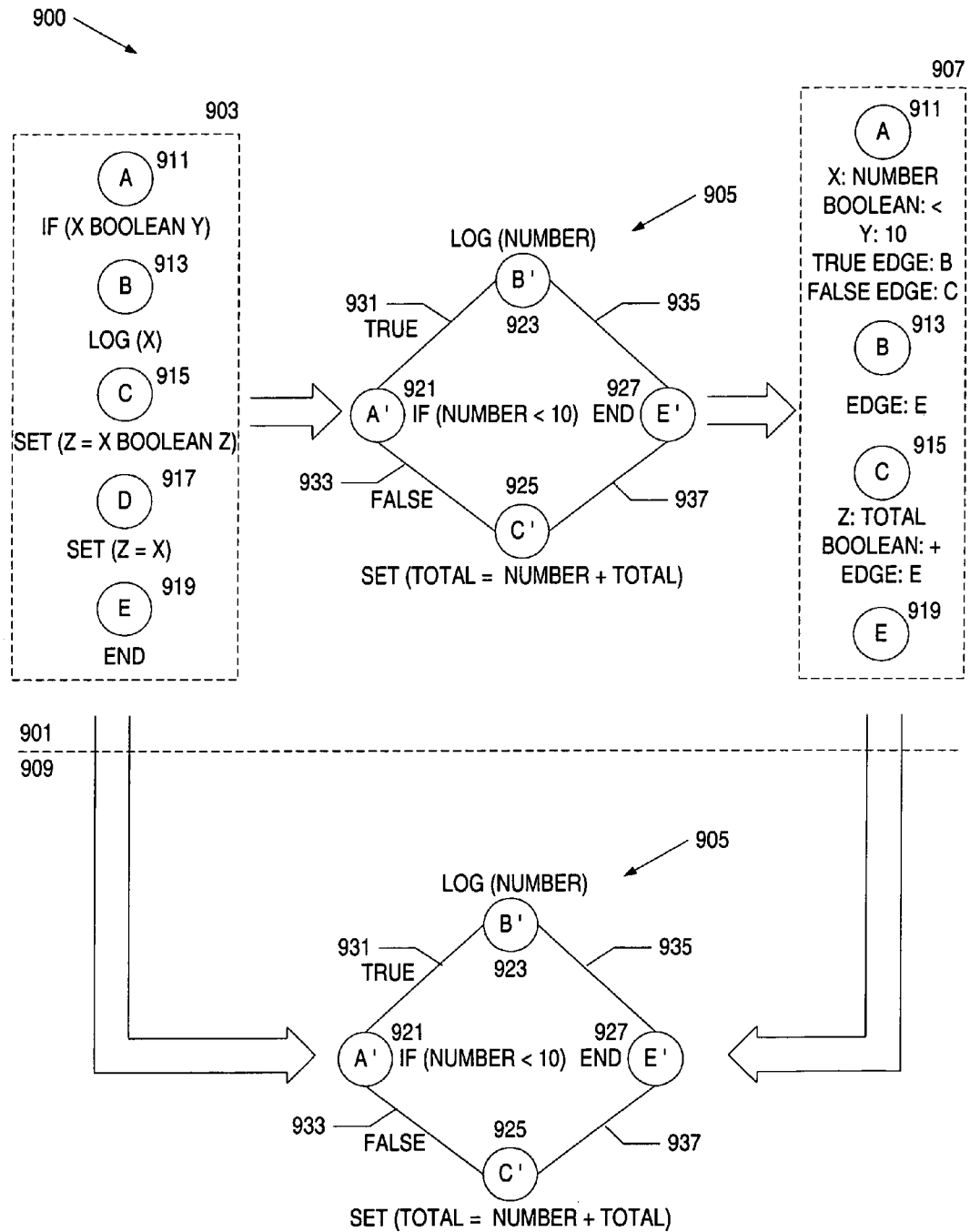
FIG. 9A is a diagram of a workflow engine for use in an implementation of the invention.

Instead of hard-coded scripts typically used to implement workflows, the iCC workflow engine 900 dynamically creates a script for a workflow from two files as described in conjunction with FIG. 9A. Definitions for prototype nodes 911, 913, 915, 917, 919 are stored in a template file 903. Each node is associated with workflow code that implements a high-level, compound script action, such as "play menu with interruptible prompts" or "play music until an agent is available," that are available to the workflow engine 900. The script actions are built from workflow steps. For ease of explanation, the script actions represented in FIG. 9A are simple, single commands, e.g., node A 911 represents the function "if(x boolean y)," where "x," "boolean," and "y" are parameters that will be replaced by values specified by an instance of the node A 911. It will be appreciated that the invention is not limited by the example or by the workflow steps shown herein.

When in configuration mode 901, the workflow engine 900 (or a supporting application) enables a user, such as a system administrator, to create a workflow 905 by selecting the appropriate nodes from the template file 903, specifying the appropriate values for the parameters in the script command, and linking the nodes together to form a directed graph that represents the desired workflow. Thus, for example, when node A' 921 is executed, the function "if (number<10)" is evaluated, with a true result causing edge 931 to be followed to execute node B' 923 and a false result causing edge 933 to be followed to execute node C' 925. A configuration file 907 is created from the directed graph and specifies the structure for the workflow 905. The configuration file 907 contains an identifier for each corresponding prototype node, along with the values, edge information and other settings (configuration data) associated with each node in the graph. It will be appreciated that any of the common input methodologies used to obtain user input can be employed to create the directed graph for the workflow, including a graphical user interface that gives the user drag-and-drop capabilities to allow the placement and rearrangement of nodes and edges, and dialog boxes that request the appropriate parameters.

When the workflow 905 is to be executed by the workflow engine 900 in run-time mode 909, the workflow engine 900 references the configuration file 907 and reconstructs the directed graph for the workflow 905 in memory by merging the corresponding prototype nodes from the template file 903 with the configuration data associated with the nodes in the configuration file 907. The workflow engine initiates a new thread of execution to execute the workflow script represented by the directed graph. Thus, the workflow engine 900 abstracts out the code and connectors when the user creates a workflow and subsequently reconstructs the workflow from the abstractions when it is to be executed.

Unlike typical workflow implementations, all iCC workflow steps can execute asynchronously by storing its result to a prioritized message queue in its thread of execution. Additionally, step may spawn another execution thread to create a multithreaded workflow. Similar classes of steps may share one queue with one execution thread for all requests of that type from a single workflow or across workflows. As previously described, various workflow steps request a service from a subsystem. The subsystems inject service events into the workflow by placing event notifications in the message queue. The retrieval of messages from the queue is implemented using three special workflow steps: RegisterEvent, UnRegisterEvent, and GetMessage.

RegisterEvent and UnRegisterEvent modify handlers for events. By default, an event is handled in-line in the node that caused the event. RegisterEvent specifies a target node that will handle the event instead (referred to as "chaining"). Handlers are stacks: when a handler is registered using RegisterEvent, the target node for that event is pushed onto the stack; when UnRegisterEvent is called, the stack is popped.

The GetMessage step fetches a message from the queue. When the message is an event notification for which a registration (via RegisterEvent) has been made, the workflow engine branches to the target node to handle the event. If the event was not explicitly registered, the current node is pushed onto the stack to handle the event.

Figure 9B:
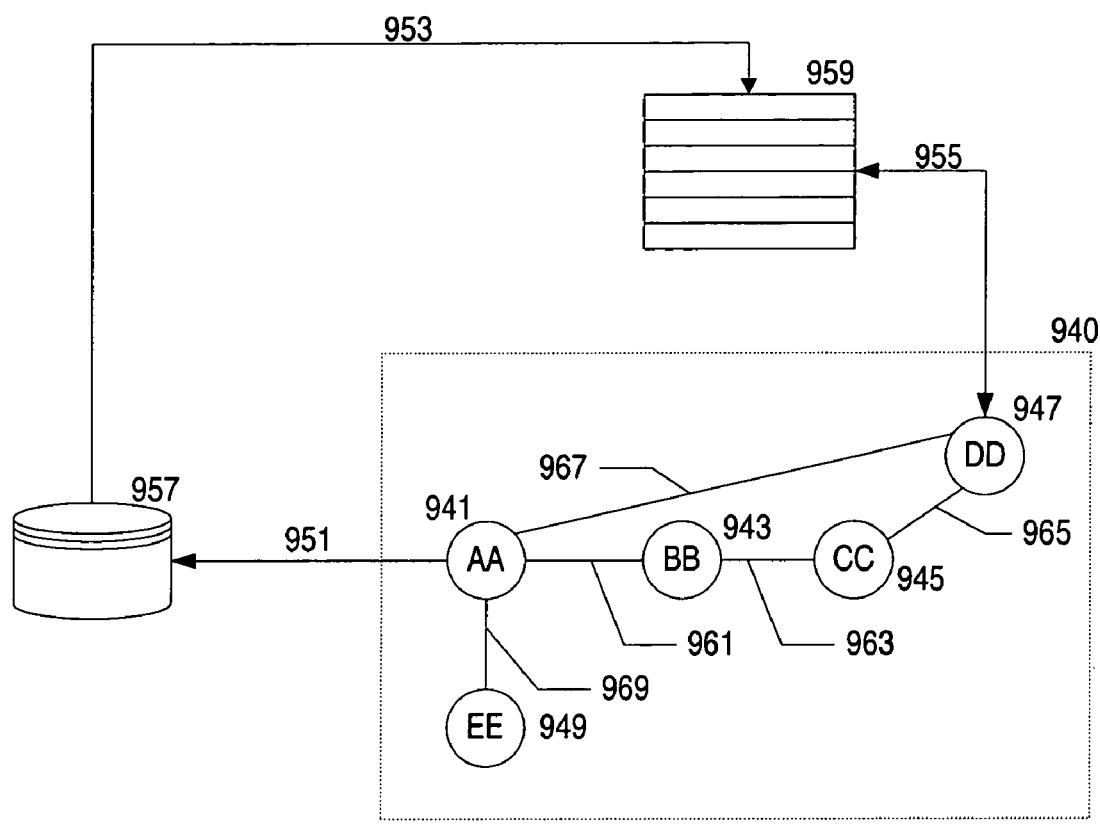
FIG. 9B is a diagram of an asynchronous workflow executed by the workflow engine of FIG. 9A.

An example of the asynchronous processing of the workflow steps is illustrated in FIG. 9B. A workflow 904 begins at node AA 941. As part of its code, node AA 941 requests (arrow 951) that the database subsystem retrieve a record from the unified database 957. When the record is retrieved, the database subsystem stores (arrow 953) an event notification in a message queue 959. Instead of waiting for the database subsystem to retrieve the record, the node AA 941 registers itself as the target node to handle the event. The workflow continues processing, executing node BB 943 and node CC 945, before reaching node DD 947, which requests (arrow 955) messages from a queue 959. Assuming that the event notification is in the queue 959, it will be returned (arrow 955) to node DD 947, which in turns, returns (edge 967) the event notification to node AA 941 for handling. Once node AA 941 has received the record, it passes (edge 969) it onto node EE 949 for further processing.

In one embodiment, the template and configuration files are XML documents, with the nodes represented by XML elements, and the code and configuration information stored as XML attributes for the corresponding XML elements. The code and configuration information are written in the JPython scripting language. A JPython-aware execution proxy merges the information from the template and configuration files, and provides an interface between the thread of execution for the workflow and the actual workflow steps. Because the execution proxy insulates the thread of execution from the workflow steps, steps may use multiple scripting languages simultaneously, allowing the developer of the prototype nodes to chose the best code to perform a given function.

Operating Environment

Figure 10A:
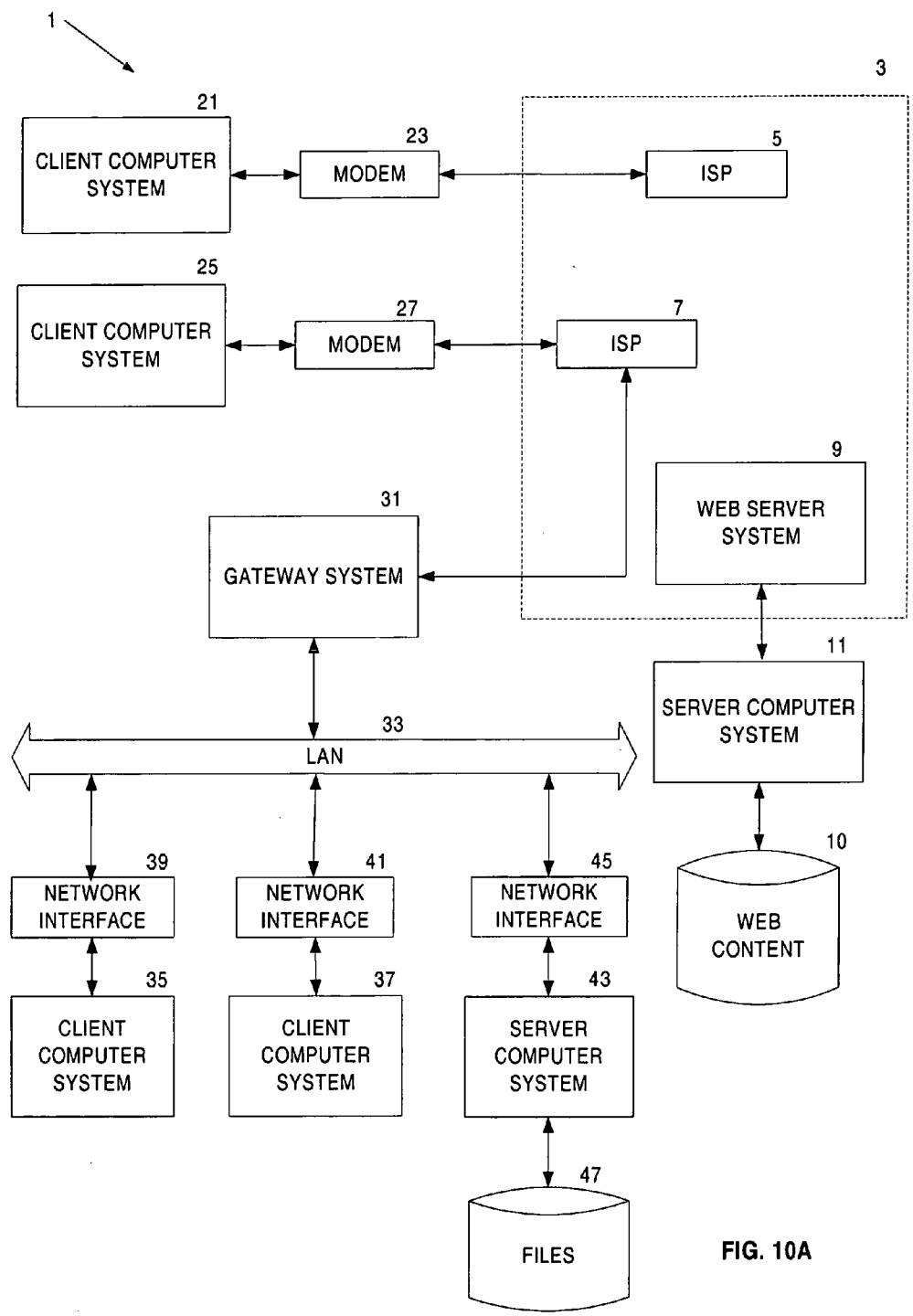
FIG. 10A is a diagram of one embodiment of an operating environment suitable for practicing the present invention.
Figure 10B:
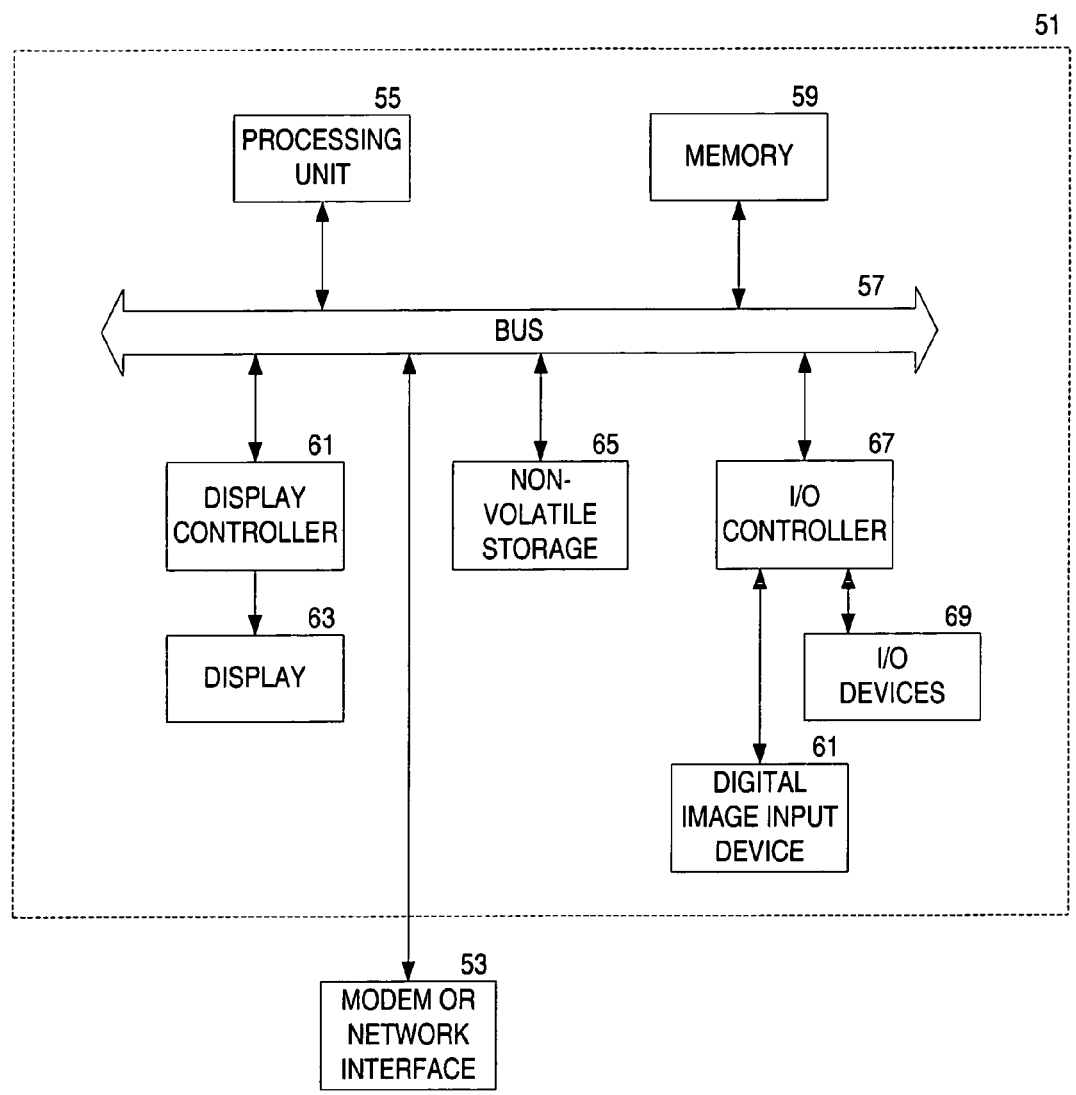
FIG. 10B is a diagram of one embodiment of a computer system suitable for use in the operating environment of FIG. 10A.

The following description of FIGS. 10A–B is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 10A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well-known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 10A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 10A, the connections are not the same for these three computer systems. Client computer system 25 is coupled through a modem interface 27 while client computer systems 35 and 37 are part of a LAN. While FIG. 10A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 10B shows one example of a conventional computer system that can be used as a client computer system or a server computer system or as a web server system. It will also be appreciated that such a computer system can be used to perform many of the functions of an Internet service provider, such as ISP 105. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processor 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory x59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 10B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the Windows family of operating systems from Microsoft Corporation of Redmond, Wash., and the associated file management systems. The file management system is typically stored in the non-volatile storage 65 and causes the processor 55 to execute the various acts required by the operating system to input and output data and to store data in memory, including storing files on the non-volatile storage 65.

CONCLUSION

A tiered service model providing escalation and de-escalation of contacts in a multimedia digital contact center has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to networks is meant to include all of network environments, including private wide-area networks and local-area networks. Therefore, it is manifestly intended that this invention be limited only by the following claims and equivalents thereof.

APPENDIX A

William E. Alford, Reg. No. 37,764; Farzad E. Amini, Reg. No. 42,261; William Thomas Babbitt, Reg. No. 39,591; Carol F. Barry, Reg. No. 41,600; Jordan Michael Becker, Reg. No. 39,602; Lisa N. Benado, Reg. No. 39,995; Bradley J. Bereznak, Reg. No. 33,474; Michael A. Bernadicou, Reg. No. 35,934; Roger W. Blakely, Jr., Reg. No. 25,831; R. Alan Burnett, Reg. No. 46,149; Gregory D. Caldwell, Reg. No. 39,926; Andrew C. Chen, Reg. No. 43,544; Thomas M. Coester, Reg. No. 39,637; Donna Jo Coningsby, Reg. No. 41,684; Florin Corie, Reg. No. 46,244; Dennis M. deGuzman, Reg. No. 41,702; Stephen M. De Klerk, Reg. No. 46,503; Michael Anthony DeSanctis, Reg. No. 39,957; Daniel M. De Vos, Reg. No. 37,813; Sanjeet Dutta, Reg. No. 46,145; Matthew C. Fagan, Reg. No. 37,542; Tarek N. Fahmi, Reg. No. 41,402; George Fountain, Reg. No. 37,374; James Y. Go, Reg. No. 40,621; James A. Henry, Reg. No. 41,064; Libby N. Ho, Reg. No. 46,774; Willmore F. Holbrow III, Reg. No. 41,845; Sheryl Sue Holloway, Reg. No. 37,850; George W Hoover II, Reg. No. 32,992; Eric S. Hyman, Reg. No. 30,139; William W. Kidd, Reg. No. 31,772; Sang Hui Kim, Reg. No. 40,450; Walter T. Kim, Reg. No. 42,731; Eric T. King, Reg. No. 44,188; George Brian Leavell, Reg. No. 45,436; Kurt P. Leyendecker, Reg. No. 42,799; Gordon R. Lindeen III, Reg. No. 33,192; Jan Carol Little, Reg. No. 41,181; Robert G. Litts, Reg. No. 46,876; Joseph Lutz, Reg. No. 43,765; Michael J. Mallie, Reg. No. 36,591; Andre L. Marais, under 37 C.F.R. § 10.9(b); Paul A. Mendonsa, Reg. No. 42,879; Clive D. Menezes, Reg. No. 45,493; Chun M. Ng, Reg. No. 36,878; Thien T. Nguyen, Reg. No. 43,835; Thinh V. Nguyen, Reg. No. 42,034; Dennis A. Nicholls, Reg. No. 42,036; Daniel E. Ovanezian, Reg. No. 41,236; Kenneth B. Paley, Reg. No. 38,989; Gregg A. Peacock, Reg. No. 45,001; Marina Portnova, Reg. No. 45,750; William F. Ryann, Reg. 44,313; James H. Salter, Reg. No. 35,668; William W. Schaal, Reg. No. 39,018; James C. Scheller, Reg. No. 31,195; Jeffrey Sam Smith, Reg. No. 39,377; Maria McCormack Sobrino, Reg. No. 31,639; Stanley W. Sokoloff, Reg. No. 25,128; Judith A. Szepesi, Reg. No. 39,393; Vincent P. Tassinari, Reg. No. 42,179; Edwin H. Taylor, Reg. No. 25,129; John F. Travis, Reg. No. 43,203; Joseph A. Twarowski, Reg. No. 42,191; Tom Van Zandt, Reg. No. 43,219; Lester J. Vincent, Reg. No. 31,460; Glenn E. Von Tersch, Reg. No. 41,364; John Patrick Ward, Reg. No. 40,216; Mark L. Watson, Reg. No. 46,322; Thomas C. Webster, Reg. No. 46,154; and Norman Zafman, Reg. No. 26,250; my patent attorneys, and Firasat Ali, Reg. No. 45,715; Justin M. Dillon, Reg. No. 42,486; Thomas S. Ferrill, Reg. No. 42,532; and Raul Martinez, Reg. No. 46,904, my patent agents, of BLAKELY, SOKOLOFF, TAYLOR & ZAFMAN LLP, with offices located at 12400 Wilshire Boulevard, 7th Floor, Los Angeles, Calif. 90025, telephone (310) 207-3800, and James R. Thein, Reg. No. 31,710, my patent attorney with full power of substitution and revocation, to prosecute this application and to transact all business in the Patent and Trademark Office connected herewith.

APPENDIX B

Title 37, Code of Federal Regulations, Section 1.56
Duty to Disclose Information Material to Patentability (a) A patent by its very nature is affected with a public interest. The public interest is best served, and the most effective patent examination occurs when, at the time an application is being examined, the Office is aware of and evaluates the teachings of all information material to patentability. Each individual associated with the filing and prosecution of a patent application has a duty of candor and good faith in dealing with the Office, which includes a duty to disclose to the Office all information known to that individual to be material to patentability as defined in this section. The duty to disclosure information exists with respect to each pending claim until the claim is cancelled or withdrawn from consideration, or the application becomes abandoned. Information material to the patentability of a claim that is cancelled or withdrawn from consideration need not be submitted if the information is not material to the patentability of any claim remaining under consideration in the application. There is no duty to submit information which is not material to the patentability of any existing claim. The duty to disclosure all information known to be material to patentability is deemed to be satisfied if all information known to be material to patentability of any claim issued in a patent was cited by the Office or submitted to the Office in the manner prescribed by §§1.97(b)–(d) and 1.98. However, no patent will be granted on an application in connection with which fraud on the Office was practiced or attempted or the duty of disclosure was violated through bad faith or intentional misconduct. The Office encourages applicants to carefully examine:

(1) Prior art cited in search reports of a foreign patent office in a counterpart application, and (2) The closest information over which individuals associated with the filing or prosecution of a patent application believe any pending claim patentably defines, to make sure that any material information contained therein is disclosed to the Office.

(b) Under this section, information is material to patentability when it is not cumulative to information already of record or being made or record in the application, and (1) It establishes, by itself or in combination with other information, a prima facie case of unpatentability of a claim; or (2) It refutes, or is inconsistent with, a position the applicant takes in:

(i) Opposing an argument of unpatentability relied on by the Office, or (ii) Asserting an argument of patentability.

A prima facie case of unpatentability is established when the information compels a conclusion that a claim is unpatentable under the preponderance of evidence, burden-of-proof standard, giving each term in the claim its broadest reasonable construction consistent with the specification, and before any consideration is given to evidence which may be submitted in an attempt to establish a contrary conclusion of patentability.

(c) Individuals associated with the filing or prosecution of a patent application within the meaning of this section are:

(1) Each inventor named in the application;

(2) Each attorney or agent who prepares or prosecutes the application; and (3) Every other person who is substantively involved in the preparation or prosecution of the application and who is associated with the inventor, with the assignee or with anyone to whom there is an obligation to assign the application.

(d) Individuals other than the attorney, agent or inventor may comply with this section by disclosing information to the attorney, agent, or inventor.

What is claimed is:

1. A computerized method for determining a service tier for a contact in a digital multimedia contact center, each tier having a queue, the method comprising:

determining an initial service tier for the contact based on routing criteria for the contact and placing the contact into the queue for that tier;

de-escalating the contact to a lower service tier if a change in the routing criteria does not satisfy pre-defined criteria for the initial service tier and placing the contact into the queue for the lower service tier; and escalating the contract to a higher service tier if a change in the routing criteria satisfies pre-defined criteria for the higher service tier and placing the contact into the queue for the higher service tier.

2. The computerized method of claim 1 further comprising initially determining the routing criteria based on a media type associated with the contact.

3. The computerized method of claim 1 further comprising changing the routing criteria through a workflow for the contact.

4. The computerized method of claim 1 further comprising changing the routing criteria based on contact activity.

5. A computer-readable medium comprising a storage device, having computer-executable instructions comprising:

receiving a contact and assigning to a queue of an initial service tier for the contact in a digital multimedia contact center based on routing criteria for the contact, wherein each tier has a queue;

de-escalating the contact to a lower service tier if a change in the routing criteria does not satisfy pre-defined criteria for the initial service tier and placing the contact into the queue for the lower service tier; and escalating the contract to a higher service tier if a changer in the routing criteria satisfies pre-defined criteria for the higher service tier and placing the contact into the queue for the higher service tier.

6. The computer-readable medium of claim 5 having further computer-executable instructions comprising:

initially determining the routing criteria based on a media type associated with the contact.

7. The computer-readable medium of claim 5 having further computer-executable instructions comprising changing the routing criteria through a workflow for the contact.

8. The computer-readable medium of claim 5 having further computer-executable instructions comprising changing the routing criteria based on contact activity.

9. A computer system comprising:

a processing unit;

a memory coupled to the processing unit through a bus; and a service tiering process executed from the memory to cause the processing unit to determine an initial service tier having a queue for a contact in a digital multimedia contact center based on routing criteria for the contact, wherein each tier has a queue, to de-escalating the contact to a lower service tier if a change in the routing criteria does not satisfy pre-defined criteria for the initial service tier and placing the contact into the queue for the lower service tier, and to escalate the contract to a higher service tier if a change in the routing criteria satisfies pre-defined criteria for the higher service tier and placing the contact into the queue for the higher service tier.

10. The computer system of claim 9, wherein the service tiering process further causes the processing unit to initially determine the routing criteria based on a media type associated with the contact.

11. The computer system of claim 9, wherein the service tiering process further causes the processing unit to change the routing criteria through execution of a workflow for the contact.

12. The computer system of claim 9, wherein the service tiering process further causes the processing unit to change the routing criteria based on contact activity.

* * * * *